United States Patent
Gao et al.

(10) Patent No.: US 11,272,494 B2
(45) Date of Patent: Mar. 8, 2022

(54) RADIO COMMUNICATION METHOD, CHIP, AND SYSTEM

(71) Applicant: HUAWEI TECHNOLOGIES CO., LTD., Guangdong (CN)

(72) Inventors: Fei Gao, Shanghai (CN); Shurong Jiao, Shanghai (CN); Xiaolei Tie, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 117 days.

(21) Appl. No.: 16/747,892

(22) Filed: Jan. 21, 2020

(65) Prior Publication Data

US 2020/0163063 A1 May 21, 2020

Related U.S. Application Data

(63) Continuation of application No. PCT/CN2018/099427, filed on Aug. 8, 2018.

(30) Foreign Application Priority Data

Aug. 11, 2017 (CN) .......................... 201710687175.8

(51) Int. Cl.
*H04W 72/04* (2009.01)
*H04W 72/12* (2009.01)
(Continued)

(52) U.S. Cl.
CPC .......... *H04W 72/042* (2013.01); *H04L 5/0053* (2013.01); *H04W 48/12* (2013.01); *H04W 72/0446* (2013.01); *H04W 72/12* (2013.01)

(58) Field of Classification Search
CPC .... H04W 72/12; H04W 48/12; H04L 5/0094; H04L 1/001; H04L 5/0053
See application file for complete search history.

(56) References Cited

U.S. PATENT DOCUMENTS

2012/0201216 A1 8/2012 Wu
2013/0195039 A1 8/2013 Pan et al.
(Continued)

FOREIGN PATENT DOCUMENTS

CN 102056198 A 5/2011
CN 102170703 A 8/2011
(Continued)

OTHER PUBLICATIONS

R1-153193 NTT Docomo, Inc.,"Discussion on DL control signalling enhancements for Rel.13 CA",3GPP TSG RAN WG1 Meeting #81,Fukuoka, Japan, May 25-29, 2015,total 5 pages.
(Continued)

*Primary Examiner* — Faruk Hamza
*Assistant Examiner* — Abusayeed M Haque
(74) *Attorney, Agent, or Firm* — Westerman, Hattori, Daniels & Adrian, LLP

(57) ABSTRACT

A radio communication method, a chip, and a system, to improve physical downlink control channel decoding reliability and communication quality. The method includes: obtaining, in a second scheduling period based on a first candidate downlink control channel and first information, a second candidate downlink control channel from a first control resource set corresponding to the second scheduling period, where the first information is used to indicate a correspondence between the first candidate downlink control channel and the second candidate downlink control channel, and the first candidate downlink control channel is any candidate downlink control channel in a first control resource set corresponding to a first scheduling period; and combining and decoding the first candidate downlink control channel and the second candidate downlink control channel.

15 Claims, 8 Drawing Sheets

(51) Int. Cl.
  *H04L 5/00* (2006.01)
  *H04L 1/00* (2006.01)
  *H04W 48/12* (2009.01)

(56) References Cited

U.S. PATENT DOCUMENTS

| | | | |
|---|---|---|---|
| 2013/0195041 | A1 | 8/2013 | Papasakellariou et al. |
| 2013/0315113 | A1 | 11/2013 | Seo et al. |
| 2014/0211730 | A1* | 7/2014 | Seo ............... H04L 5/0053 370/329 |
| 2015/0327223 | A1 | 11/2015 | Zhang et al. |
| 2016/0242158 | A1* | 8/2016 | Takeda ............... H04L 5/14 |
| 2017/0142700 | A1* | 5/2017 | Pan ............... H04L 5/0037 |
| 2020/0119874 | A1* | 4/2020 | Liu ............... H04L 5/0048 |
| 2020/0154500 | A1* | 5/2020 | Zhou ............... H04W 72/1289 |
| 2020/0221401 | A1* | 7/2020 | Zhu ............... H04W 76/27 |
| 2020/0236666 | A1* | 7/2020 | Yu ............... H04W 72/0446 |
| 2020/0244411 | A1* | 7/2020 | Takeda ............... H04B 7/0413 |
| 2020/0305167 | A1* | 9/2020 | Freda ............... H04W 72/0493 |
| 2020/0336957 | A1* | 10/2020 | Wu ............... H04W 36/08 |
| 2021/0014791 | A1* | 1/2021 | Freda ............... H04W 52/0229 |
| 2021/0160841 | A1* | 5/2021 | Wu ............... H04W 72/0413 |

FOREIGN PATENT DOCUMENTS

| | | |
|---|---|---|
| CN | 102447529 A | 5/2012 |
| CN | 103733707 A | 4/2014 |
| CN | 103874202 A | 6/2014 |
| CN | 104205690 A | 12/2014 |
| CN | 105007617 A | 10/2015 |
| CN | 106160954 A | 11/2016 |
| WO | 2009058905 A2 | 5/2009 |

OTHER PUBLICATIONS

R1-1706919 Huawei, HiSilicon,"Grant-free transmission for UL URLLC",3GPP TSG RAN WG1 Meeting #89, Hangzhou, China, May 15-19, 2017,total 7 pages.
R1-1710550 Intel Corporation,"Satisfying ultra-reliability targets for NR PDCCH",3GPP TSG RAN WG1 NR Ad-Hoc#2 , Qingdao, P.R. China Jun. 27-30, 2017,total 4 pages.
Office Action dated Jan. 19, 2020, issued in counterpart CN Application No. 201710687175.8, with English translation. (11 pages).
International Search Report dated Oct. 16, 2018, issued in counterpart No. PCT/CN2018/099427, with English translation. (12 pages).
LG Electronics:"Discussion an DL control with ultra-reliability", 3GPP TSG RAN WG1 Ad-Hoc#2, R1-1710312, Qingdao, P.R. China Jun. 27-30, 2017, total 3 pages XP051299528; Cited in EESR dated Sep. 11, 2020.
Extended Search Report dated Sep. 11, 2020, issued in counterpart EP Application No. 18844015.0 (9 pages).
Office Action dated Feb. 25, 2021, issued in counterpart IN Application No. 202047002664, with English Translation. (7 pages).
Office Action dated Sep. 14, 2021, issued in counterpart CN Application No. 202011078079.1, with English Translation. (12 pages).

* cited by examiner

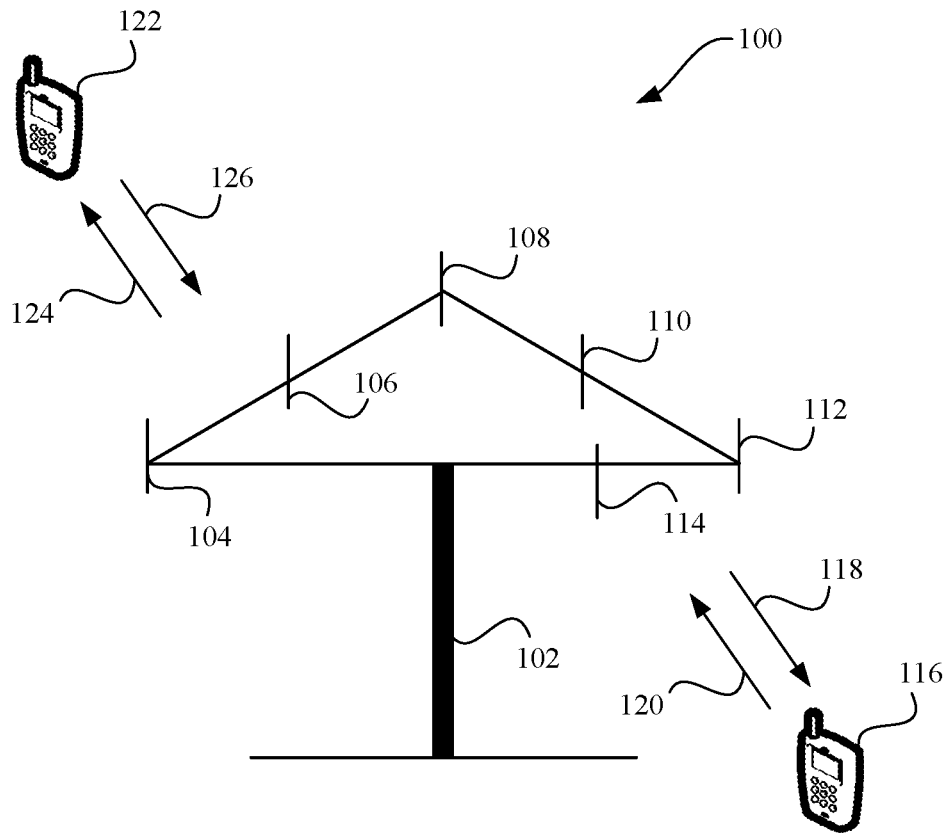

Obtain, in a second scheduling period based on a first candidate downlink control channel and first information, a second candidate downlink control channel from a first control resource set corresponding to the second scheduling period, where the first information is used to indicate a correspondence between the first candidate downlink control channel and the second candidate downlink control channel — Step 210

Combine and decode the first candidate downlink control channel and the second candidate downlink control channel — Step 220

Select a first candidate downlink control channel and a corresponding second candidate downlink control channel in a second scheduling period based on first information, where the first candidate downlink control channel is any downlink control channel in a first control resource set in a first scheduling period, the second candidate downlink control channel is any downlink control channel in a first control resource set in the second scheduling period, downlink control information of the first candidate downlink control channel and downlink control information of the second candidate downlink control channel are the same, and the first information is used to indicate a correspondence between any downlink control channel in the first scheduling period and any downlink control channel in the second scheduling period — Step 310

Combine and decode the first candidate downlink control channel and the second candidate downlink control channel — Step 320

Select a first candidate downlink control channel and a corresponding second candidate downlink control channel in a second scheduling period based on first information, where the first information indicates that positions and sizes of frequency domain resources of downlink control channels in the plurality of scheduling periods are the same — Step 410

Combine and decode the first candidate downlink control channel and the second candidate downlink control channel — Step 420

FIG. 6

RADIO COMMUNICATION METHOD, CHIP, AND SYSTEM

CROSS-REFERENCE TO RELATED APPLICATIONS

This application is a continuation of International Application No. PCT/CN2018/099427, filed on Aug. 8, 2018, which claims priority to Chinese Patent Application No. 201710687175.8, filed on Aug. 11, 2017. The disclosures of the aforementioned applications are hereby incorporated by reference in their entireties.

TECHNICAL FIELD

This application relates to the communications field, and more specifically, to a radio communication method, a chip, and a system.

BACKGROUND

An ultra-reliable and low-latency communication (Ultra Reliable Low Latency communication, URLLC) scenario imposes an extremely high requirement on a latency. Without considering reliability, a transmission latency is required to be within 0.5 millisecond (ms). On the premise of reaching 99.999% reliability, a transmission latency is required to be within 1 ms. However, directly increasing a coding gain or a processing gain (for example, using a high aggregation level) of a physical downlink control channel (PDCCH) is an ineffective method for increasing transmission reliability of the PDCCH. Therefore, how to improve PDCCH decoding reliability and communication quality is an issue that needs to be resolved urgently.

SUMMARY

This application provides a radio communication method, to improve PDCCH decoding reliability and communication quality.

According to a first aspect, a radio communication method is provided, including:

obtaining, in a second scheduling period based on a first candidate downlink control channel and first information, a second candidate downlink control channel from a first control resource set corresponding to the second scheduling period, where the first information is used to indicate a correspondence between the first candidate downlink control channel and the second candidate downlink control channel, where the first candidate downlink control channel is any candidate downlink control channel in a first control resource set corresponding to a first scheduling period; and combining and decoding the first candidate downlink control channel and the second candidate downlink control channel.

In this way, the combining and decoding, in the second scheduling period, the second candidate downlink control channel in the second scheduling period and the first candidate downlink control channel in the first scheduling period avoids a phenomenon that when quality of a downlink control channel is comparatively poor, user equipment cannot decode the downlink control channel to obtain downlink control information in one scheduling period. This increases a probability of successfully decoding a PDCCH.

Optionally, the one scheduling period may be a subframe, or may be a mini-slot.

Optionally, before the obtaining a second candidate downlink control channel based on a first candidate downlink control channel and first information, the method further includes:

obtaining an offset between a sequence number of the second candidate downlink control channel and a sequence number of the first candidate downlink control channel, a first aggregation level of the first candidate downlink control channel, and a second aggregation level of the second candidate downlink control channel based on second information; and the obtaining a second candidate downlink control channel based on a first candidate downlink control channel and first information includes:

obtaining the second candidate downlink control channel based on the first information, the first candidate downlink control channel, the offset, the first aggregation level, and the second aggregation level.

In this case, a quantity of attempts to combine and decode the PDCCHs is reduced, thereby avoiding combining and decoding of a plurality of candidate downlink control channels, and improving PDCCH decoding efficiency.

Optionally, when the first scheduling period is corresponding to a plurality of control resource sets, or the second scheduling period is corresponding to a plurality of control resource sets, the method further includes:

obtaining the first control resource set in the first scheduling period and the first control resource set in the second scheduling period based on third information.

Optionally, the first scheduling period is adjacent to or not adjacent to the second scheduling period.

Optionally, the first information, the second information, and the third information are preconfigured, or received from a network device, or stored locally.

According to a second aspect, a radio communication method is provided, including:

selecting a first candidate downlink control channel and a corresponding second candidate downlink control channel in a second scheduling period based on first information, where the first candidate downlink control channel is any candidate downlink control channel in a first control resource set corresponding to a first scheduling period, and the second candidate downlink control channel is any candidate downlink control channel in a first control resource set in the second scheduling period;

the first information is used to indicate a correspondence between a candidate downlink control channel in the first scheduling period and a candidate downlink control channel in the second scheduling period; and combining and decoding the first candidate downlink control channel and the second candidate downlink control channel.

In this way, the combining and decoding, in the second scheduling period, the second candidate downlink control channel in the second scheduling period and the first candidate downlink control channel in the first scheduling period avoids a phenomenon that when quality of a downlink control channel is comparatively poor, user equipment cannot decode the downlink control channel to obtain downlink control information in one scheduling period. This increases a probability of successfully decoding a PDCCH.

Optionally, the selecting a first candidate downlink control channel and a corresponding second candidate downlink control channel based on first information includes:

obtaining the first candidate downlink control channel and the second candidate downlink control channel based on the correspondence between a candidate downlink control channel in the first scheduling period and a candidate downlink control channel in the second scheduling period.

In this case, a quantity of attempts to combine and decode the PDCCHs is reduced, thereby avoiding combining and decoding of a plurality of candidate downlink control channels, and improving PDCCH decoding efficiency.

Optionally, the combining and decoding the first candidate downlink control channel and the second candidate downlink control channel includes:

obtaining a first aggregation level of the first candidate downlink control channel and a second aggregation level of the second candidate downlink control channel based on second information, where decoding manners of candidate downlink control channels at different aggregation levels are different; and combining and decoding the first candidate downlink control channel at the first aggregation level and the second candidate downlink control channel at the second aggregation level.

Optionally, when the first scheduling period is corresponding to a plurality of control resource sets, or the second scheduling period is corresponding to a plurality of control resource sets, the method further includes:

obtaining the first control resource set in the first scheduling period and the first control resource set in the second scheduling period based on third information.

Optionally, the first scheduling period is adjacent to or not adjacent to the second scheduling period.

Optionally, the first information, the second information, and the third information are preconfigured, or received from a network device, or stored locally.

According to a third aspect, a radio communication method is provided, including:

receiving first downlink control information, where the first downlink control information includes a transmission order of a first downlink control channel, and the first downlink control information includes a redundancy version and a frequency domain resource position of data carried on a downlink shared channel in a first scheduling period; and obtaining, based on first information and the redundancy version and the frequency domain resource position of the data carried on the downlink shared channel in the first scheduling period, scheduling information of data carried on a plurality of downlink shared channels, where the first information is used to indicate a correspondence between a transmission order of a plurality of downlink control channels and the scheduling information of the data carried on the plurality of downlink shared channels.

In this way, the obtaining, based on the first information and the first downlink control information, the scheduling information of the data carried on the plurality of downlink shared channels and combining and decoding the data carried on the plurality of downlink shared channels avoids a phenomenon that when quality of the downlink control channel is comparatively poor, user equipment cannot decode the downlink shared channel in one scheduling period to obtain downlink scheduling data. This increases a probability of successfully decoding the PDSCH.

Optionally, the first information includes a correspondence between the transmission order of the plurality of downlink control channels and a redundancy version and/or a frequency domain resource position of data carried on downlink shared channels corresponding to the plurality of downlink control channels.

Optionally, the obtaining, based on first information and the redundancy version and the frequency domain resource position of the data carried on the downlink shared channel in the first scheduling period, scheduling information of a plurality of downlink shared channels includes:

obtaining frequency domain resource positions of the plurality of downlink shared channels based on the frequency domain resource position of the data carried on the downlink shared channel in the first scheduling period and an offset, in the first information, between a downlink shared channel in each of a plurality of scheduling periods and a first downlink shared channel; and/or obtaining a redundancy version of the downlink shared channel in each of the plurality of scheduling periods from the first information.

Optionally, after the obtaining, based on first information and the redundancy version and the frequency domain resource position of the data carried on the downlink shared channel in the first scheduling period, scheduling information of data carried on a plurality of downlink shared channels, the method further includes:

decoding, based on the scheduling information of the data carried on the first downlink shared channel, the data carried on the first downlink shared channel, to obtain downlink scheduling data; or combining and decoding, based on the scheduling information of the data carried on the first downlink shared channel and scheduling information of data carried on a downlink shared channel that is not decoded and that is before the first downlink shared channel, the data carried on the downlink shared channel that is before the first downlink shared channel and the data carried on the first downlink shared channel, to obtain downlink scheduling data.

Optionally, the first information is preconfigured, or received from a network device, or stored locally.

According to a fourth aspect, a system chip is provided. The system chip includes an input/output interface, at least one processor, at least one memory, and a bus. The at least one memory is configured to store code, and the at least one processor is configured to invoke the code in the at least one memory, to perform the operations of the method in each of the foregoing aspects.

According to a fifth aspect, a system is provided. The system includes: a terminal device, where the terminal device is configured to perform the method in the first aspect or any optional implementation of the first aspect, the method in the second aspect or any optional implementation of the second aspect, or the method in the third aspect or any optional implementation of the third aspect; and a network device configured to serve the terminal device.

BRIEF DESCRIPTION OF DRAWINGS

FIG. 1 is a schematic diagram of a communications system using a radio communication method, a chip, and a system according to this application;

FIG. 2 is a schematic flowchart of a radio communication method 200 according to this application;

FIG. 5 is a schematic flowchart of a radio communication method 300 according to this application;

FIG. 6 is a schematic flowchart of a radio communication method 400 according to this application;

DESCRIPTION OF EMBODIMENTS

Figure 3:
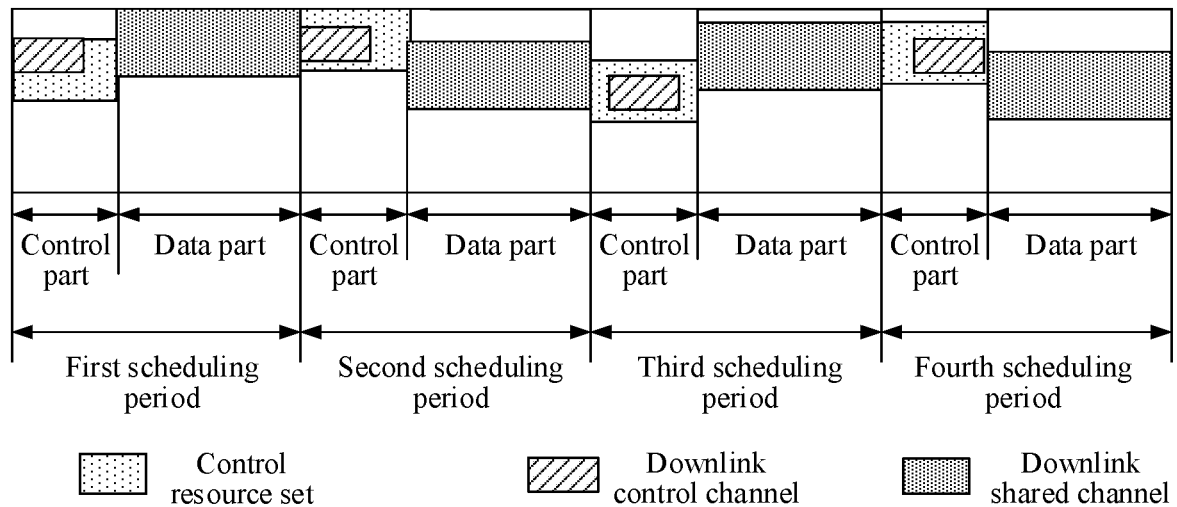
FIG. 3 is a schematic block diagram of downlink control channels in different scheduling periods according to this application.

The following describes technical solutions in this application with reference to accompanying drawings.

To facilitate understanding on the embodiments of the present invention, several elements are introduced before the embodiments of the present invention are described.

A PDCCH is a physical downlink control channel, and is located in control domain of a time-frequency resource in a subframe. In other words, the PDCCH occupies first N orthogonal frequency division multiplexing (OFDM) symbols in one TTI in time domain, and is indicated by a physical control format indicator channel (PCFICH), where $0 < N \leq 3$. When a system bandwidth is 1.4 Mhz, N may be 4. The PDCCH occupies all available subcarriers in a system bandwidth in the frequency domain. The available subcarriers herein are subcarriers excluding those occupied by the PCFICH, a physical hybrid automatic repeat request indicator channel (physical HARQ indicator channel, PHICH, where hybrid automatic repeat request is HARQ for short), and a reference signal. A resource indicated by one OFDM symbol in the time domain dimension and one subcarrier in the frequency domain dimension is referred to as a resource element (RE), and four REs constitute one resource element group (REG). A control channel element (CCE) is further defined for the PDCCH, and one CCE includes nine REGs. For example, when the system bandwidth is 5 Mhz, a total of 25 physical resource blocks (physical resource block, PRB) are included in frequency domain. One PRB occupies twelve subcarriers in the frequency domain and 0.5 ms in time domain. Resource mapping manners of the PCFICH, the PHICH, and the reference signal are fixed, and UE first detects the PCFICH in the fixed resource mapping manner, to obtain a quantity N of OFDM symbols occupied by the PDCCH. For example, N=2, a total of 600 REs are included, in other words, 150 REGs are included. If the PCFICH, the PHICH, and the reference signal occupy a total of 57 REGs, available resources on the PDCCH are 93 REGs, namely, about 10 CCEs.

There are four PDCCH formats, and PDCCHs in different formats occupy different quantities of resources, in other words, aggregation levels (aggregation level, AL) are different. Content carried on the PDCCH is referred to as downlink control information (DCI), and a size of the DCI is fixed. Different bit rates are obtained when different PDCCH formats are used. For example, a bit rate of a format 2 is twice that of a format 3. A smaller quantity of occupied CCEs indicates a higher bit rate and requires a better channel condition of UE. A probability of correctly decoding a PDCCH with a high bit rate by the UE can be increased only in this way. To be specific, if a channel condition of the UE is comparatively poor, only low-bit-rate transmission can be selected, for example, selecting a format of a PDCCH that occupies a larger quantity of CCEs. In addition, the UE does not need to perform blind detection for a PDCCH with a bit rate greater than ¾. According to different channel conditions of the UE, different transmission modes may be configured by a higher layer for the UE. The different transmission modes are corresponding to different DCI sizes. In addition to a current transmission mode configured by the higher layer, each UE can further use a fallback mode by default, and a DCI size corresponding to the fallback mode is different from a DCI size corresponding to the current mode.

In one TTI, an available control domain resource aggregates CCEs based on a tree structure to form available PDCCHs in different formats. When a CCE aggregation level AL is equal to 1, one CCE constitutes one PDCCH in a format 0. When a CCE aggregation level AL is equal to 2, two consecutive CCEs constitute one PDCCH in a format 1. When a CCE aggregation level AL is equal to 4, four consecutive CCEs constitute one PDCCH in a format 2. When a CCE aggregation level AL is equal to 8, eight consecutive CCEs constitute one PDCCH in a format 3. That is, Table 1 shows a relationship among a PDCCH format, a CCE aggregation level, and a quantity of occupied CCEs.

TABLE 1

| PDCCH format (Format) | CCE aggregation level AL | Quantity of CCEs |
|---|---|---|
| Format 0 | 1 | 1 |
| Format 1 | 2 | 2 |
| Format 2 | 4 | 4 |
| Format 3 | 8 | 8 |

All CCEs may be divided into two types of search spaces: a common search space and a UE-specific search space. The common search space includes CCEs numbered 0 to 15, namely, first 16 CCEs. A PDCCH in the common search space is mainly used to carry common DCI, and all UEs need to detect the DCI in the common search space, to obtain common scheduling information such as system information. There are only two PDCCH formats of in the common search space: the format 2 and the format 3. There are the foregoing four PDCCH formats in the UE-specific search space, for carrying UE-specific DCI. Each PDCCH format, namely, each aggregation level, is corresponding to one UE-specific search space. Different UE-specific search spaces may overlap. As shown in Table 2, a size of the search space, namely, a quantity of PDCCH candidate channels is related to only an aggregation level.

TABLE 2

| Type | Aggregation level AL | Quantity of CCEs | Quantity of PDCCH candidate channels |
| --- | --- | --- | --- |
| Search space | | | |
| UE-specific search space | 1 | 6 | 6 |
| | 2 | 12 | 6 |
| | 4 | 8 | 2 |
| | 8 | 16 | 2 |
| Common search space | 4 | 16 | 4 |
| | 8 | 16 | 2 |

For example, in the UE-specific search space, there are six PDCCH candidate channels in a search space corresponding to AL=2, and six consecutive PDCCH candidate channels constitute one search space whose AL is equal to 2.

A control resource set (CORESET) is a concept newly proposed in NR, and may be understood as a time-frequency resource set. In time domain, one CORESET may be configured as one or several consecutive OFDM symbols; and in frequency domain, one CORESET may be a group of contiguous or non-contiguous frequency domain resources, including search spaces at different aggregation levels.

FIG. 1 is a schematic diagram of a communications system using a radio communication method and a device according to this application. As shown in FIG. 1, the communications system 100 includes a network device 102, and the network device 102 may include a plurality of antennas, for example, antennas 104, 106, 108, 110, 112, and 114. In addition, the network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

The network device 102 may communicate with a plurality of terminal devices (such as a terminal device 116 and a terminal device 122). However, it can be understood that the network device 102 may communicate with any quantity of terminal devices similar to the terminal device 116 or 122.

As shown in the FIG. 1, the terminal device 116 communicates with the antennas 112 and 114, where the antennas 112 and 114 send information to the terminal device 116 by using a forward link 118, and receive information from the terminal device 116 by using a reverse link 120. In addition, the terminal device 122 communicates with the antennas 104 and 106, where the antennas 104 and 106 send information to the terminal device 122 by using a forward link 124, and receive information from the terminal device 122 by using a reverse link 126.

For example, in a frequency division duplex (FFD) system, the forward link 118 and the reverse link 120 may use different frequency bands, and the forward link 124 and the reverse link 126 may use different frequency bands.

For another example, in a time division duplex (TDD) system and a full duplex system, the forward link 118 and the reverse link 120 may use the same frequency band, and the forward link 124 and the reverse link 126 may use the same frequency band.

Each antenna (or an antenna group including a plurality of antennas) and/or each area that are/is designed for communication may be referred to as a sector of the network device 102. For example, the antenna group may be designed for communicating with a terminal device in a sector of a coverage area of the network device 102. In a process in which the network device 102 communicates with the terminal devices 116 and 122 respectively by using the forward links 118 and 124, a transmit antenna of the network device 102 may improve the signal-to-noise ratios of the forward links 118 and 124 through beamforming. In addition, compared with a manner in which the network device sends signals to all terminal devices by using a single antenna, in this embodiment, when the network device 102 sends, through beamforming, signals to the terminal devices 116 and 122 dispersed randomly in a related coverage area, smaller interference is caused onto a mobile device in a neighboring cell.

In a given time, the network device 102, the terminal device 116, or the terminal device 122 may be a radio communication sending apparatus and/or a radio communication receiving apparatus. When sending data, the radio communications sending apparatus may encode data for transmission. Specifically, the radio communication sending apparatus may obtain (for example, generate, receive from another communications apparatus, or store in a memory) a particular quantity of data bits to be sent to the radio communication receiving apparatus through a channel. The data bits may be included in a transport block (or a plurality of transport blocks) of data, and the transport block may be segmented to generate a plurality of code blocks.

In addition, the communications system 100 may be a public land mobile network (PLMN), a device to device (D2D) network, a machine to machine (M2M) network, or another network. FIG. 1 is only an example of a simplified schematic diagram. The network may further include another network device that is not shown in FIG. 1.

Optionally, in this application, the network device may be a device that communicates with a terminal device, for example, a network device or a network device controller. Each network device may provide communication coverage for a specific geographic area, and may communicate with a terminal device (such as an UE) located in the coverage area (a cell). The network device may support communication protocols of different standards, or may support different communication modes. For example, the network device may be a network device (base transceiver station, BTS) in a GSM system or a CDMA system, or may be a network device (NodeB, NB) in a WCDMA system, or may be an evolved network device (evolved node b, eNB or eNodeB) in an LTE system, or a radio controller in a cloud radio network (CRAN). Alternatively, the network device may be a network device in a future 5G network, for example, a gNB, a small cell, a micro base station, or a transmission reception point (TRP), or may be a relay station, an access point, a network device in a future evolved public land mobile network (PLMN), or the like.

Optionally, in this application, the terminal device may be an access terminal, user equipment (UE), a subscriber unit, a subscriber station, a mobile station, a remote station, a remote terminal, a mobile terminal, a user terminal, a terminal, a radio communications device, a user agent, a user apparatus, or the like. The access terminal may be a cellular phone, a cordless phone, a session initiation protocol (SIP) phone, a wireless local loop (WLL) station, a personal digital assistant (PDA), a handheld device that has a radio communication function, a computing device, another processing device connected to a wireless modem, an vehicle-mounted device, a wearable device, a terminal device in an internet of things, a virtual reality device, a terminal device in a future 5G network, a terminal device in a future evolved public land mobile network (PLMN), or the like.

The radio communication method and device provided in this application may be applied to a terminal device. The terminal device includes a hardware layer, an operating system layer that is run above the hardware layer, and an application layer that is run above the operating system layer. The hardware layer includes hardware such as a central processing unit (CPU), a memory management unit (MMU), and a memory (also referred to as a main memory). The operating system may be any one or more of computer operating systems that process a service by using a process, for example, a Linux operating system, a Unix operating system, an Android operating system, an iOS operating system, or a Windows operating system. The application layer includes applications such as a browser, a contact list, text processing software, and instant communications software.

In addition, aspects or features of this application may be implemented as a method, an apparatus, or an artifact that uses standard programming and/or engineering technologies. The term "product" used in this application covers a computer program that can be accessed from any computer readable component, carrier, or medium. For example, the computer readable medium may include but is not limited to a magnetic storage device (for example, a hard disk, a floppy disk, or a magnetic tape), an optical disc (for example, a compact disc (CD) or a digital versatile disc (DVD)), a smart card, and a flash memory device (for example, an erasable programmable read-only memory (EPROM), a card, a stick, or a key drive). In addition, various storage media described in this specification may represent one or more devices and/or other machine readable media that are configured to store information. The term "machine readable media" may include but is not limited to various media that can store, contain, and/or carry an instruction and/or data.

For better understanding of this application, with reference to FIG. 2 to FIG. 15, the following describes this application by using an example of a system that is the same as or similar to the system shown in FIG. 1.

In step 210: Obtain, in a second scheduling period based on a first candidate downlink control channel and first information, a second candidate downlink control channel from a first control resource set corresponding to the second scheduling period, where the first information is used to indicate a correspondence between the first candidate downlink control channel and the second candidate downlink control channel.

The first candidate downlink control channel is any candidate downlink control channel in a first control resource set corresponding to a first scheduling period.

In the method, scheduling periods corresponding to a plurality of downlink control channels that carry same downlink control information are consecutive scheduling periods, and a start scheduling period for transmitting the PDCCH is preset. User equipment may obtain, according to a sequence number of the scheduling period, a specific repeat PDCCH transmission order in the current scheduling period.

In step 220: Combine and decode the first candidate downlink control channel and the second candidate downlink control channel.

Specifically, in the second scheduling period, the second candidate downlink control channel in the second scheduling period is obtained based on the first information and the first candidate downlink control channel in the first scheduling period, and the first candidate downlink control channel and the second candidate downlink control channel are combined and decoded, to obtain downlink control information.

In this way, the combining and decoding, in the second scheduling period, the second candidate downlink control channel in the second scheduling period and the first candidate downlink control channel in the first scheduling period avoids a phenomenon that when quality of a downlink control channel is comparatively poor, the user equipment cannot decode the downlink control channel in one scheduling period to obtain the downlink control information. This increases a probability of successfully decoding the PDCCH.

Optionally, in the second scheduling period, a sequence number of a second candidate downlink control channel is obtained, based on a sequence number of the first candidate downlink control channel and the first information, from the first control resource set corresponding to the second scheduling period.

Optionally, the one scheduling period may be a subframe, or may be a mini-slot.

Optionally, before the obtaining a second candidate downlink control channel based on a first candidate downlink control channel and first information, the method further includes:

obtaining an offset between the second candidate downlink control channel and the first candidate downlink control channel, a first aggregation level of the first candidate downlink control channel, and a second aggregation level of the second candidate downlink control channel based on second information; and the obtaining a second candidate downlink control channel based on a first candidate downlink control channel and first information includes:

obtaining the second candidate downlink control channel based on the first information, the first candidate downlink control channel, the offset, the first aggregation level, and the second aggregation level.

Specifically, the second information includes the offset between the second candidate downlink control channel and the first candidate downlink control channel, the first aggregation level of the first candidate downlink control channel, and the second aggregation level of the second candidate downlink control channel. The second candidate downlink control channel is obtained based on the first information, the first candidate downlink control channel, the offset, the first aggregation level, and the second aggregation level.

For example, as shown in FIG. 3, a network device and a terminal device predefine that a PDCCH is repeatedly sent separately in four consecutive scheduling periods. The network device and the terminal device agree to start sending the PDCCH from the first subframe, the first slot, or the first mini-slot, and a sequence number of the subframe, the slot, or the mini-slot is k, where k=1, 2, 3, 4. In a different subframe k or a different slot k or a different mini-slot k, it is assumed that the downlink control information is mapped to a candidate downlink control channel whose aggregation level $AL_k$ is equal to 1, a quantity $N_{AL_k}$ of candidate downlink control channels whose aggregation level $AL_k$ is equal to 1 is 4, and a corresponding candidate downlink control channel sequence number is $X_{k,AL_k}$, where $X_{k,AL_k} \in$. In consecutive scheduling periods, $\Delta_k$ is an offset between a sequence number of a candidate downlink control channel that carries downlink control information in another subframe, another slot, or another mini-slot, and a sequence number of a candidate downlink control channel that carries downlink control information in the first subframe, the first slot, or the first mini-slot. A value of $\Delta_k$ may be configured by the network device for a user, and the user is notified of the value of $\Delta_k$ by using higher layer signaling (for example, RRC signaling). Alternatively, a value of Ak is delivered by the network device to a user by using physical layer signaling (for example, DCI signaling), or is stored in the terminal device as specified in a communications protocol. The communications protocol specifies that $\Delta 2=0$, $\Delta 3=2$, and $\Delta 4=1$. A correspondence between sequence numbers of the candidate downlink control channels that may be combined in different scheduling periods meets Formula (1).

$$X_{k,AL_k} = (X_{1,AL_1} + \Delta_k) \bmod N_{AL_k} + 1, \text{ where } k=2, 3, 4 \quad (1)$$

$X_{k,AL_k}$ represents the sequence number of the candidate downlink control channel in the subframe k, the slot k, or the mini-slot k at the aggregation level $AL_k$, and mod represents a modulo operation.

The second information is shown in Table 3. Table 3 shows a correspondence among a scheduling period number, an aggregation level, and a candidate channel offset.

TABLE 3

| Scheduling period number k | 1 | 2 | 3 | 4 |
|---|---|---|---|---|
| Aggregation level $AL_k$ | 1 | 1 | 1 | 1 |
| Candidate downlink control channel offset $\Delta_k$ | — | $\Delta 2$ | $\Delta 3$ | $\Delta 4$ |

In the second scheduling period, if one PDCCH candidate in a first scheduling period is selected, and a PDCCH candidate in the second scheduling period is obtained according to Formula (1) and Table 1, when a sequence number of the selected PDCCH candidate in the first scheduling period is 1, the sequence number "1" and $\Delta 2$ of the PDCCH candidate are substituted into Formula (1), to obtain a sequence number 2 of the PDCCH candidate in the second scheduling period;

when a sequence number of the selected PDCCH candidate in the first scheduling period is 2, the sequence number "2" and $\Delta 2$ of the PDCCH candidate are substituted into Formula (1), to obtain a sequence number 3 of the PDCCH candidate in the second scheduling period;

when a sequence number of the selected PDCCH candidate in the first scheduling period is 3, the sequence number "3" and $\Delta 2$ of the PDCCH candidate are substituted into Formula (1), to obtain a sequence number 4 of the PDCCH candidate in the second scheduling period; and when a sequence number of the selected PDCCH candidate in the first scheduling period is 4, the sequence number "4" and $\Delta 2$ of the PDCCH candidate are substituted into Formula (1), to obtain a sequence number 1 of the PDCCH candidate in the second scheduling period.

If each subframe number, each slot number, or each mini-slot number, an aggregation level, and a sequence number of a candidate downlink control channel at the given aggregation level are substituted into Formula (1), the following is obtained:
  when k=1, $X_{1,AL_1} = X_{1,1} = 1, 2, 3,$ or 4;
  when k=2, $X_{2,AL_2} = X_{2,1} = 2, 3, 4,$ or 1;
  when k=3, $X_{3,AL_3} = X_{3,1} = 4, 1, 2,$ or 3; and
  when k=4, $X_{4,AL_4} = X_{4,1} = 3, 4, 1,$ or 2.

Sequence number combinations of candidate downlink control channels that may be combined in four scheduling periods and whose $AL_k$ is equal to 1 are (1, 2, 4, 3), (2, 3, 1, 4), (3, 4, 2, 1), and (4, 1, 3, 2).

For another example, in the scenario described in FIG. 3, a correspondence between sequence numbers of the candidate downlink control channels that may be combined in different scheduling periods may meet Formula (2).

$$X_{k,AL_k} = \begin{cases} X_{1,AL_1} + \Delta_k + 1 & , (Z_{1,AL_1} + \Delta_k) < N_{AL_k} \\ (X_{1,AL_1} - N_{AL_k}) + \Delta_k + 1 & , (X_{1,AL_1} + \Delta_k) \geq N_{AL_k} \end{cases} \quad (2)$$

In Formula (2), $X_{k,AL_k} \in \{1, 2, 3, 4\}$. It is assumed that the communications protocol specifies that $\Delta 2=0$, $\Delta 3=2$, and $\Delta 4=1$. If each subframe number, each slot number, or each mini-slot number, an aggregation level, and a sequence number of a candidate downlink control channel at the given aggregation level are substituted into Formula (2), the following is obtained:
  when k=1, $X_{1,AL_1} = X_{1,1} = 1, 2, 3,$ or 4;
  when k=2, $X_{2,AL_2} = X_{2,1} = 2, 3, 4,$ or 1;
  when k=3, $X_{3,AL_3} = X_{3,1} = 4, 1, 2,$ or 3; and
  when k=4, $X_{4,AL_4} = X_{4,1} = 3, 4, 1,$ or 2.

It should be understood that the aggregation levels of the candidate downlink control channels in the different scheduling periods may be the same or may be different. In this embodiment, that the aggregation levels of the candidate downlink control channels in different scheduling periods are the same is merely used as an example, and constitutes no limitation.

If the terminal device misses detecting the PDCCH in the first scheduling period, the terminal device attempts, in the second scheduling period based on the first information and the second information, to combine and decode the PDCCH candidate in the first scheduling period and a corresponding PDCCH candidate in the second scheduling period, and attempted combinations of the PDCCH candidates are (1, 2), (2, 3), (3, 4), and (4, 1). In this case, a quantity of combinations by using which the terminal device attempts to perform combining and decoding can be reduced. To be specific, the terminal device does not need to decode combinations: (1, 1), (1, 3), (1, 4), (2, 1), (2, 2), (2, 4), (3, 1), (3, 2), (3, 3), (4, 2), (4, 3), and (4, 4).

Optionally, when the first scheduling period is corresponding to a plurality of control resource sets, or the second scheduling period is corresponding to a plurality of control resource sets, the method further includes:

obtaining the first control resource set in the first scheduling period and the first control resource set in the second scheduling period based on third information.

Specifically, the third information includes indication information of the first control resource set in the first scheduling period and indication information of a first control resource set in the second scheduling period. The first control resource set in the first scheduling period and the first control resource set in the second scheduling period are obtained based on the third information.

For example, as shown in Table 4, Table 4 shows indication information of a first control resource set CORESET in different scheduling periods.

TABLE 4

| Scheduling period number k | 1 | 2 | 3 | 4 |
|---|---|---|---|---|
| CORESET sequence number $l_k$ | 1 | 2 | 2 | 1 |

Optionally, the second information may include the third information.

Specifically, the second information includes a scheduling period number, an offset between the second candidate downlink control channel and the first candidate downlink control channel, a first aggregation level of the first candidate downlink control channel, a second aggregation level of the second candidate downlink control channel, and indication information of the first control resource set in the scheduling period.

Figure 4:
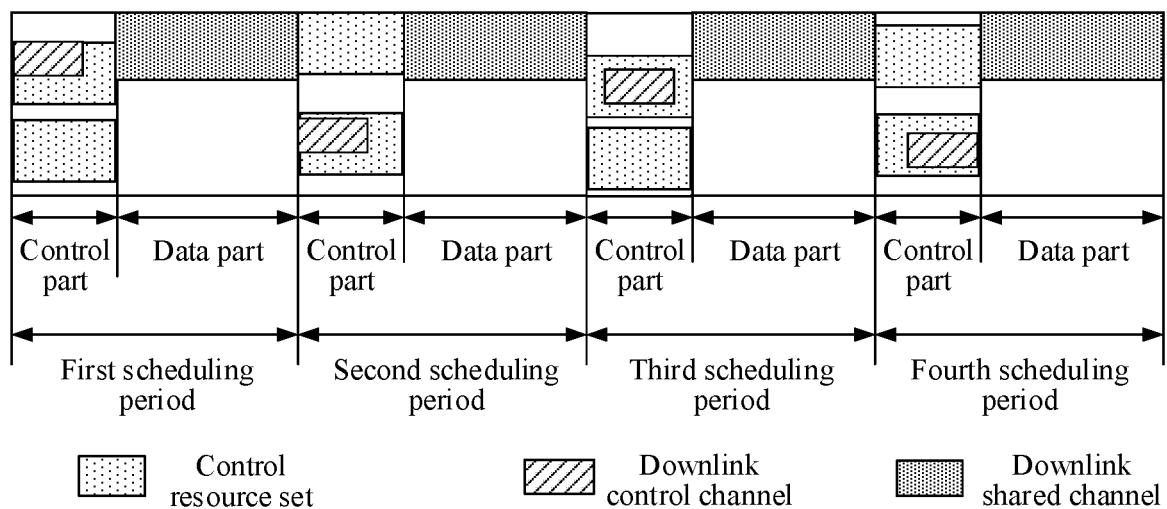
FIG. 4 is a schematic block diagram of downlink control channels in different scheduling periods according to this application.

For example, as shown in FIG. 4, the network device and the terminal device predefine that a PDCCH is repeatedly sent separately in four consecutive scheduling periods. The network device and the terminal device agree to start sending the PDCCH from the first subframe, the first slot, or the first mini-slot, and a sequence number of the subframe, the slot, or the mini-slot is k, where k=1, 2, 3, 4. It is assumed that there are two control resource sets in each scheduling period, and the network device selects one of the control resource sets and configures the control resource set for the terminal device. $l_k$ is used to represent a sequence number $l_k \in \{1, 2\}$ of a control resource set to which the downlink control information is mapped in the subframe k, the slot k, or the mini-slot k. It is assumed that, in a control resource set $l_k$ in a different subframe k, a different slot k, or a different mini-slot k, the downlink control information is mapped to a candidate downlink control channel whose aggregation level $AL_{k,l_k}$ is equal to 1, a quantity $N_{AL_k, k_k}$ of candidate downlink control channels whose $AL_{k,l_k}$ is equal to 1 is 4, and a sequence number of a corresponding candidate downlink control channel $$X_{k, AL_{k,l_k}}$$

$\in \{1, 2, 3, 4\}$. In consecutive scheduling periods, $\Delta_k$ is an offset between a sequence number of a candidate downlink control channel that carries downlink control information in another subframe, another slot, or another mini-slot, and a sequence number of a candidate downlink control channel that carries downlink control information in the first subframe, the first slot, or the first mini-slot. A value of $\Delta_k$ may be configured by the network device for a user, and the user is notified of the value of $\Delta_k$ by using higher layer signaling (for example, RRC signaling). Alternatively, a value of $\Delta_k$ is delivered by the network device to a user by using physical layer signaling (for example, DCI signaling), or is stored in the terminal device as specified in a communications protocol. The communications protocol specifies that $\Delta 2=0$, $\Delta 3=2$, and $\Delta 4=1$. A correspondence between sequence numbers of the candidate downlink control channels that may be combined in different scheduling periods meets:

$$X_{k,l_k, AL_{k,l_k}} = (X_{1,l_1, AL_{k,l_k}}) \bmod N_{AL_{k,l_k}} + 1, k = 2, 3, 4 \quad (3)$$

In the formula, $X_{k,l_k,AL_{k,l_k}}$ represents a sequence number of a candidate downlink control channel in the control resource set $l_k$ in the subframe k, the slot k, or the mini-slot k at the aggregation level $AL_{k,l_k}$.

The second information is shown in Table 5. Table 5 shows a correspondence among a scheduling period number, an aggregation level, and a candidate channel offset.

TABLE 5

| Scheduling period number k | 1 | 2 | 3 | 4 |
|---|---|---|---|---|
| CORESET sequence number lk | 1 | 2 | 2 | 1 |
| Aggregation level $AL_{k, l_k}$ | 1 | 1 | 1 | 1 |
| Candidate downlink control channel offset Δk | — | Δ2 | Δ3 | Δ4 |

If each subframe number, each slot number, or each mini-slot number, a control resource set sequence number, an aggregation level, and a sequence number of a candidate downlink control channel at the given aggregation level are substituted into Formula (3), the following is obtained:
when k=1, $X_{1,l_1,AL_{1,l_1}} = X_{1,1,1} = 1, 2, 3,$ or 4;
when k=2, $X_{2,l_2,AL_{2,l_2}} = X_{2,2,1} = 2, 3, 4,$ or 1;
when k=3, $X_{3,l_3, AL_3 l_3} = X_{3,2,1} = 4, 1, 2,$ or 3; and
when k=4, $X_{4,l_4,AL_{4,l_4}} = X_{4,1,1} = 3, 4, 1,$ or 2.

For another example, in the scenario described in FIG. 4, a correspondence between sequence numbers of the candidate downlink control channels that may be combined in different scheduling periods meets Formula (4).

$$X_{k,l_k, AL_{k,l_k}} = \begin{cases} X_{1,l_1 AL_{1,l_1}} + \Delta_k + 1 & , (Z_{1,l_1 AL_{1,l_1}} + \Delta_k) < N_{AL_{k,l_k}} \\ (X_{1,l_1 AL_{1,l_1}} - N_{AL_{k,l_k}}) + \Delta_k + 1 & , (X_{1,l_1 AL_{1,l_1}} + \Delta_k) \geq N_{AL_{k,l_k}} \end{cases} \quad (4)$$

In Formula (2), $X_{k,AL_k} \in \{1, 2, 3, 4\}$. It is assumed that the communications protocol specifies that $\Delta 2=0$, $\Delta 3=2$, and $\Delta 4=1$. If each subframe number, each slot number, or each mini-slot number, an aggregation level, and a sequence number of a candidate downlink control channel at the given aggregation level are substituted into Formula (4), the following is obtained:
when k=1, $X_{1,l_1,AL_{1,l_1}} = X_{1,1,1} = 1, 2, 3,$ or 4;
when k=2, $X_{2,l_2,AL_{2,l_2}} = X^{2,2,1} = 2, 3, 4$ or 1;
when k=3, $X_{3,l_3,AL_3,l_3} = X_{3,2,1} = 4, 1, 2,$ or 3; and
when k=4, $X_{4,l_4,AL_{4,l_4}} = X_{4,1,1} = 3, 4, 1,$ or 2.

Sequence number combinations of candidate downlink control channels that may be combined in four scheduling periods and whose $AL_{k,l_k}$ is equal to 1 are (1, 2, 4, 3), (2, 3, 1, 4), (3, 4, 2, 1), and (4, 1, 3, 2).

In a fourth scheduling period, a PDCCH in at least one previous scheduling period that needs to be combined with a PDCCH in the fourth scheduling period may be obtained, or PDCCHs that need to be combined in four scheduling periods may be obtained. According to Formula 2 and Table 3, an attempt to combine and decode PDCCH candidates in four scheduling periods is made, and attempted combinations of the PDCCH candidates are (1, 2, 4, 3), (2, 3, 1, 4), (3, 4, 2, 1), and (4, 1, 3, 2).

For another example, the network device and the terminal device predefine that a PDCCH is repeatedly sent separately in four consecutive scheduling periods. The network device and the terminal device agree to start sending the PDCCH from the first subframe, the first slot, or the first mini-slot, and a sequence number of the subframe, the slot, or the mini-slot is k, where k=1, 2, 3, 4. It is assumed that there are two control resource sets in each scheduling period, and the network device selects one of the control resource sets and configures the control resource set for the terminal device. k is used to represent a sequence number $l_k \in \{1,2\}$ of a control resource set to which the downlink control information is mapped in the subframe k, the slot k, or the mini-slot k. It is assumed that, in a control resource set $l_k$ in a different subframe k, a different slot k, or a different mini-slot k, the downlink control information is mapped to a candidate downlink control channel corresponding to a different aggregation level $N_{AL_k,l_k}$ in a different control resource set. Different aggregation levels $AL_{k,l_k}$ are corresponding to different quantities $N_{AL_k,l_k}$ of candidate downlink control channels. For example, when the aggregation level is 1 or 2, a quantity of corresponding candidate downlink control channels is 4, in other words, $AL_{k,l_k}=1$ or 2, and corresponding candidate downlink control channel sequence numbers are $X_{k,AL_k} \in \{1, 2, 3, 4\}$, and when the aggregation level is 4 or 8, $AL_{k,l_k}=4$ or 8, and a quantity of corresponding candidate downlink control channels is 2, where $X_k, AL_{,l_k} \in \{1,2\}$. The network notifies a user of a correspondence between the aggregation level and the quantity of corresponding candidate downlink control channels by using higher layer signaling (for example, RRC signaling). Alternatively, a correspondence between the aggregation level and the quantity of corresponding candidate downlink control channels is delivered by the network device to a user by using physical signaling (for example, DCI signaling), or is stored in the terminal device as specified in a communications protocol. In consecutive scheduling periods, $\Delta_k$ is an offset between a sequence number of a candidate downlink control channel that carries downlink control information in another subframe, another slot, or another mini-slot, and a sequence number of a candidate downlink control channel that carries downlink control information in the first subframe, the first slot, or the first mini-slot. A value of $\Delta_k$ may be configured by the network device for a user, and the user is notified of the value of $\Delta_k$ by using higher layer signaling (for example, RRC signaling). Alternatively, a value of $\Delta_k$ is delivered by the network device to a user by using physical layer signaling (for example, DCI signaling), or is stored in the terminal device as specified in a communications protocol. The communications protocol specifies that $\Delta 2=0$, $\Delta 3=2$, and $\Delta 4=1$. A correspondence between sequence numbers of the candidate downlink control channels that may be combined in different scheduling periods meets Formula (5).

$$X_{k,l_k,AL_{k,l_k}} = (X_{1,l_1 AL_{1,l_1}} + \Delta_k) \bmod \{\min\{N_{AL_{1,l_1}}, N_{AL_{k,l_k}}\}\} + 1, \quad (5)$$
$$k = 2, 3, 4$$

In Formula (5), $$X_{k,AL_{k,l_k}}$$

represents the sequence number of the candidate downlink control channel in the control resource set k in the subframe k, the slot k, or the mini-slot k at the aggregation level $AL_{k,l_k}$.

The second information is shown in Table 6. Table 6 shows a correspondence among a scheduling period number, an aggregation level, and a candidate channel offset.

TABLE 6

| Scheduling period number $k$ | 1 | 2 | 3 | 4 |
|---|---|---|---|---|
| CORESET sequence number $l_k$ | 1 | 2 | 2 | 1 |
| Aggregation level $AL_{k,l_k}$ | 1 | 1 | 1 | 1 |
| Candidate downlink control channel offset $\Delta_k$ | — | $\Delta 2$ | $\Delta 3$ | $\Delta 4$ |

If each subframe number, each slot number, or each mini-slot number, a control resource set sequence number, an aggregation level, and a candidate downlink control channel sequence number at the given aggregation level are substituted into Formula (5), the following is obtained:
when k=1, $X_{1,l_1,AL_{1,l_1}}=X_{1,1,2}=1, 2, 3$ or 4;
when k=2, $X_{2,l_2,AL_{2,l_2}}=X_{2,2,4}=2, 1, 2$, or 1;
when k=3, $X_{3,l_3,AL_{3,l_3}}=X_{3,2,4}=2, 1, 2$, or 1; and
when k=4, $X_{4,l_4,AL_{4,l_4}}=X_{4,1,8}=3, 2, 4$, or 2.

Sequence number combinations of candidate downlink control channels that may be combined in four scheduling periods and whose $AL_k$ is equal to 1 are (1, 2, 2, 3), (2, 1, 1, 2), (3, 2, 2, 4), and (4, 1, 1, 2).

In this case, if the terminal device misses detecting a PDCCH in one scheduling period, the terminal device combines and decodes PDCCH candidates in a plurality of scheduling periods based on first information and second information. In addition, a quantity of combinations by using which the terminal device attempts to perform combining and decoding can be reduced, thereby improving PDCCH decoding reliability and further improving PDSCH decoding reliability.

Optionally, the first scheduling period is adjacent to or not adjacent to the second scheduling period.

Optionally, the first information, the second information, and the third information are preconfigured, or received from a network device.

Specifically, the first information, the second information, and the third information may be configured by the network device for the terminal device, and delivered to the terminal device by using higher layer signaling (for example, RRC signaling), or are sent by the network device to the terminal device by using physical layer signaling (for example, DCI signaling), or are stored in the terminal device as specified in a communications protocol. For example, the first information, the second information, and the third information are stored in the terminal device as specified by the terminal device and the network device in the communications protocol.

FIG. 5 is a schematic flowchart of a radio communication method 300 according to this application. As shown in FIG. 5, the method 300 includes the following content.

In step 310: Select a first candidate downlink control channel and a corresponding second candidate downlink control channel in a second scheduling period based on first information.

The first candidate downlink control channel is any candidate downlink control channel corresponding to a first control resource set in a first scheduling period.

The second candidate downlink control channel is any candidate downlink control channel in a first control resource set in the second scheduling period. Downlink control information carried in the first candidate downlink control channel and downlink control information carried in the second candidate downlink control channel are the same.

The first information is used to indicate a correspondence between a candidate downlink control channel in the first scheduling period and a candidate downlink control channel in the second scheduling period.

In the method, scheduling periods corresponding to a plurality of downlink control channels that carry same downlink control information are consecutive scheduling periods, and a start scheduling period for transmitting the PDCCH is preset. User equipment may obtain, according to a sequence number of the scheduling period, a specific repeat PDCCH transmission order in the current scheduling period.

In step 320: Combine and decode the first candidate downlink control channel and the second candidate downlink control channel.

Specifically, the first candidate downlink control channel and the corresponding second candidate downlink control channel are selected in the second scheduling period based on the first information, and the first candidate downlink control channel and the second candidate downlink control channel are combined and decoded, to obtain downlink control information.

In this way, the combining and decoding, in the second scheduling period, the second candidate downlink control channel in the second scheduling period and the first candidate downlink control channel in the first scheduling period avoids a phenomenon that when quality of a downlink control channel is comparatively poor, the user equipment cannot decode the downlink control channel in one scheduling period to obtain the downlink control information. This increases a probability of successfully decoding the PDCCH.

Optionally, the one scheduling period may be a subframe, or may be a mini-slot.

Optionally, the selecting a first candidate downlink control channel and a corresponding second candidate downlink control channel based on first information includes:

obtaining the first candidate downlink control channel and the second candidate downlink control channel based on the correspondence between a candidate downlink control channel in the first scheduling period and a candidate downlink control channel in the second scheduling period.

Specifically, the first information includes the correspondence between a candidate downlink control channel in the first scheduling period and a candidate downlink control channel in the second scheduling period, and the first candidate downlink control channel and the corresponding second candidate downlink control channel that are selected and combined are obtained based on the first information.

For example, the network device and the terminal device predefine that a PDCCH is repeatedly sent separately in four consecutive scheduling periods, and a scheduling period for sending the PDCCH for the first time is predefined as the first subframe or the first mini-slot. Each CORESET is corresponding to four PDCCH candidates with sequence numbers 1 to 4. The first information is shown in Table 7.

TABLE 7

| Scheduling period number k | 1 | 2 | 3 | 4 |
|---|---|---|---|---|
| Candidate downlink control channel | 1 | 2 | 4 | 3 |
|  | 2 | 3 | 1 | 4 |
|  | 3 | 4 | 2 | 1 |
|  | 4 | 1 | 3 | 2 |

Optionally, the combining and decoding the first candidate downlink control channel and the second candidate downlink control channel includes:

obtaining a first aggregation level of the first candidate downlink control channel and a second aggregation level of the second candidate downlink control channel based on second information.

Decoding manners of candidate downlink control channels at different aggregation levels are different.

The first candidate downlink control channel at the first aggregation level and the second candidate downlink control channel at the second aggregation level are combined and decoded.

Specifically, the second information includes an aggregation level of a PDCCH in the first scheduling period and an aggregation level of a PDCCH in the second scheduling period.

For example, the network device and the terminal device predefine that a PDCCH is repeatedly sent separately in four consecutive scheduling periods, and a scheduling period for sending the PDCCH for the first time is predefined as the first subframe or the first mini-slot. In addition, aggregation levels of the PDCCHs in the four consecutive scheduling periods are the same. The second information is shown in Table 8.

TABLE 8

| Scheduling period number k | 1 | 2 | 3 | 4 |
|---|---|---|---|---|
| Aggregation level $AL_k$ | 1 | 1 | 1 | 1 |

Optionally, when the first scheduling period is corresponding to a plurality of control resource sets, or the second scheduling period is corresponding to a plurality of control resource sets, the method further includes:

obtaining the first control resource set in the first scheduling period and the first control resource set in the second scheduling period based on third information.

For example, the network device and the terminal device predefine that a PDCCH is repeatedly sent separately in four consecutive scheduling periods, and a scheduling period for sending the PDCCH for the first time is predefined as the first subframe or the first mini-slot. In addition, the four consecutive scheduling periods are corresponding to a plurality of control resource sets, a first control resource in the first scheduling period is a control resource set numbered 1, a first control resource in the second scheduling period is a control resource set numbered 2, and a first control resource in the third scheduling period is the control resource set numbered 2, a first control resource in the fourth scheduling period is the control resource set numbered 1. The second information is shown in Table 9.

TABLE 9

| Scheduling period number k | 1 | 2 | 3 | 4 |
|---|---|---|---|---|
| CORESET sequence number $l_k$ | 1 | 2 | 2 | 1 |

Optionally, the first information may include the second information and the third information.

Specifically, the first information includes indication information used to indicate a correspondence between a candidate downlink control channel in the first scheduling period and a candidate downlink control channel in the second scheduling period, aggregation levels of downlink control channels in the first scheduling period and the second scheduling period, the first control resource set in the first scheduling period, and the first control resource set in the second scheduling period.

For example, the network device and the terminal device predefine that a PDCCH is repeatedly sent separately in four consecutive scheduling periods, and a scheduling period for sending the PDCCH for the first time is predefined as the first subframe or the first mini-slot. Only one CORESET is in bandwidth of each scheduling period, and aggregation levels of all PDCCHs are the same. Each CORESET is corresponding to four PDCCH candidates with sequence numbers 1 to 4. The first information is shown in Table 10.

TABLE 10

| Scheduling period number k | 1 | 2 | 3 | 4 |
|---|---|---|---|---|
| Aggregation level $AL_k$ | 1 | 1 | 1 | 1 |
| Candidate downlink control channel | 1 | 2 | 4 | 3 |
|  | 2 | 3 | 1 | 4 |
|  | 3 | 4 | 2 | 1 |
|  | 4 | 1 | 3 | 2 |

If the current scheduling period is the third scheduling period, a candidate downlink control channel numbered 1 in the first scheduling period, a candidate downlink control channel numbered 2 in the second scheduling period, and a candidate downlink control channel numbered 4 in the third scheduling period may be selected for combining and decoding; or a candidate downlink control channel numbered 2 in the first scheduling period, a candidate downlink control channel numbered 3 in the second scheduling period, and a candidate downlink control channel numbered 1 in the third scheduling period may be selected for combining and decoding; or a candidate downlink control channel numbered 3 in the first scheduling period, or a candidate downlink control channel numbered 4 in the second scheduling period, and a candidate downlink control channel numbered 2 in the third scheduling period may be selected for combining and decoding; or a candidate downlink control channel numbered 4 in the first scheduling period, a candidate downlink control channel numbered 1 in the second scheduling period, and a candidate downlink control channel numbered 3 in the third scheduling period may be selected for combining and decoding.

It should be understood that, if the current scheduling period is the third scheduling period, a candidate downlink control channel numbered 1 in the first scheduling period and a candidate downlink control channel numbered 4 in the third scheduling period may alternatively be selected for combining and decoding, or a candidate downlink control channel numbered 2 in the second scheduling period and a candidate downlink control channel numbered 4 in the third scheduling period are selected for combining and decoding.

A quantity of candidate downlink control channels that are selected for combining and decoding with the downlink control channel in the current scheduling period is not limited in this application.

It should be understood that the aggregation levels of the candidate downlink control channels in the different scheduling periods may be the same or may be different.

For another example, the network device and the terminal device predefine that a PDCCH is repeatedly sent separately in four consecutive scheduling periods. The network device and the terminal device agree to start sending the PDCCH from the first subframe, the first slot, or the first mini-slot, and a sequence number of the subframe, the slot, or the mini-slot is k, where k=1, 2, 3, 4. It is assumed that there are two control resource sets in each scheduling period, and the network device selects one of the control resource sets and configures the control resource set for the terminal device. k is used to represent a sequence number $l_k \in \{1, 2\}$ of a control resource set to which the downlink control information is mapped in a subframe k, a slot k, or a mini-slot k. It is assumed that, in a control resource set in a subframe k, a slot k, or a mini-slot k, the downlink control information is mapped to a candidate downlink control channel in a control resource set, where the candidate downlink control channel is corresponding to an aggregation level $AL_{k,l_k}$. Different aggregation levels $AL_{k,l_k}$ are corresponding to different quantities $N_{AL_{k,l_k}}$ of candidate downlink control channels. For example, when the aggregation level is 1 or 2, a quantity of corresponding candidate downlink control channels is 4, in other words, $AL_{k,l_k}=1$ or 2, and corresponding candidate downlink control channel sequence numbers are $X_k$, $AL_{k,l_k} \in \{1, 2, 3, 4\}$; and when the aggregation level is 4 or 8, $AL_{k,l_k}=4$ or 8, and a quantity of corresponding candidate downlink control channels is 2, where $X_k, AL_{k,l_k} \in \{1,2\}$. The first information is shown in Table 11.

TABLE 11

| Scheduling period number k | 1 | 2 | 3 | 4 |
|---|---|---|---|---|
| Aggregation level $AL_{k, l_k}$ | 2 | 4 | 4 | 8 |
| CORESET sequence number $l_k$ | 1 | 2 | 2 | 1 |
| Candidate downlink control channel | 1 | 2 | 2 | 1 |
| | 2 | 1 | 1 | 2 |
| | 3 | 2 | 2 | 1 |
| | 4 | 1 | 1 | 2 |

Optionally, the first scheduling period is adjacent to or not adjacent to the second scheduling period.

Optionally, the first information, the second information, and the third information are preconfigured, or received from a network device.

Specifically, the first information, the second information, and the third information may be configured by the network device for the terminal device, and delivered to the terminal device by using higher layer signaling (for example, RRC signaling), or are sent by the network device to the terminal device by using physical layer signaling (for example, DCI signaling), or are stored in the terminal device as specified in a communications protocol. For example, the first information, the second information, and the third information are stored in the terminal device as specified by the terminal and the network device in the communications protocol.

FIG. 6 is a schematic flowchart of a radio communication method 400 according to this application. As shown in FIG. 6, the method 400 includes the following content.

In step 410: Select a first candidate downlink control channel and a corresponding second candidate downlink control channel in a second scheduling period based on first information.

The first candidate downlink control channel is any candidate downlink control channel in a first control resource set in a first scheduling period.

The second candidate downlink control channel is any candidate downlink control channel in a first control resource set in the second scheduling period.

The first information indicates that positions and sizes of frequency domain resources on downlink control channels in the plurality of scheduling periods are the same.

In the method, scheduling periods corresponding to a plurality of downlink control channels that carry same downlink control information are consecutive scheduling periods, and a start scheduling period for transmitting the PDCCH is preset. User equipment may obtain, according to a sequence number of the scheduling period, a specific repeat PDCCH transmission order in the current scheduling period.

In step 420: Combine and decode the first candidate downlink control channel and the second candidate downlink control channel.

Specifically, the first candidate downlink control channel and the corresponding second candidate downlink control channel are selected in the second scheduling period based on the first information, and the first candidate downlink control channel and the second candidate downlink control channel are combined and decoded, to obtain downlink control information.

In this way, the combining and decoding, in the second scheduling period, the second candidate downlink control channel in the second scheduling period and the first candidate downlink control channel in the first scheduling period avoids a phenomenon that when quality of a downlink control channel is comparatively poor, the user equipment cannot decode the downlink control channel in one scheduling period to obtain the downlink control information. This increases a probability of successfully decoding the PDCCH.

Optionally, the one scheduling period may be a subframe, or may be a mini-slot.

Optionally, the selecting a first candidate downlink control channel and a corresponding second candidate downlink control channel based on first information includes:

obtaining the first candidate downlink control channel and the second candidate downlink control channel based on first information.

Specifically, the first information indicates that positions and sizes of frequency domain resources on downlink control channels in the plurality of scheduling periods are the same, and the first candidate downlink control channel and the corresponding second candidate downlink control channel that are selected and combined are obtained based on the first information.

Optionally, the first information is preconfigured, or received from a network device.

Specifically, the first information may be configured by the network device for the terminal device, and delivered to the terminal device by using higher layer signaling (for example, RRC signaling), or are sent by the network device to the terminal device by using physical layer signaling (for example, DCI signaling), or are stored in the terminal device as specified in a communications protocol. For example, the first information is stored in the terminal device as specified by the terminal device and the network device in the communications protocol.

Figure 7:
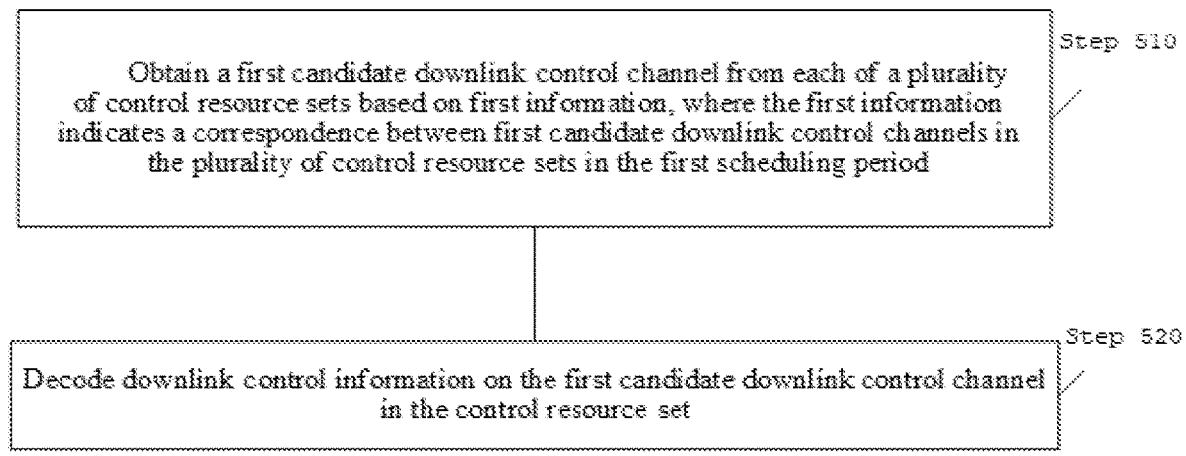
FIG. 7 is a schematic flowchart of a radio communication method 500 according to this application.

FIG. 7 is a schematic flowchart of a radio communication method 500 according to this application. As shown in FIG. 7, the method 500 includes the following content.

In step 510: Obtain a first candidate downlink control channel from each of a plurality of control resource sets based on first information, where the first information indicates a correspondence between first candidate downlink control channels in the plurality of control resource sets in the first scheduling period.

The first candidate downlink control channels in all of the plurality of control resource sets in the first scheduling period carry same downlink control information.

In step 520: Decode downlink control information on the first candidate downlink control channel in the control resource set.

In this case, if a same PDCCH is sent in the plurality of control resource sets corresponding to the first scheduling period, and the terminal device combines the plurality of PDCCHs based on the first information to obtain the downlink control information. This increases a probability of successfully decoding the PDCCH.

It should be understood that the first scheduling period is the current scheduling period.

Figure 8:
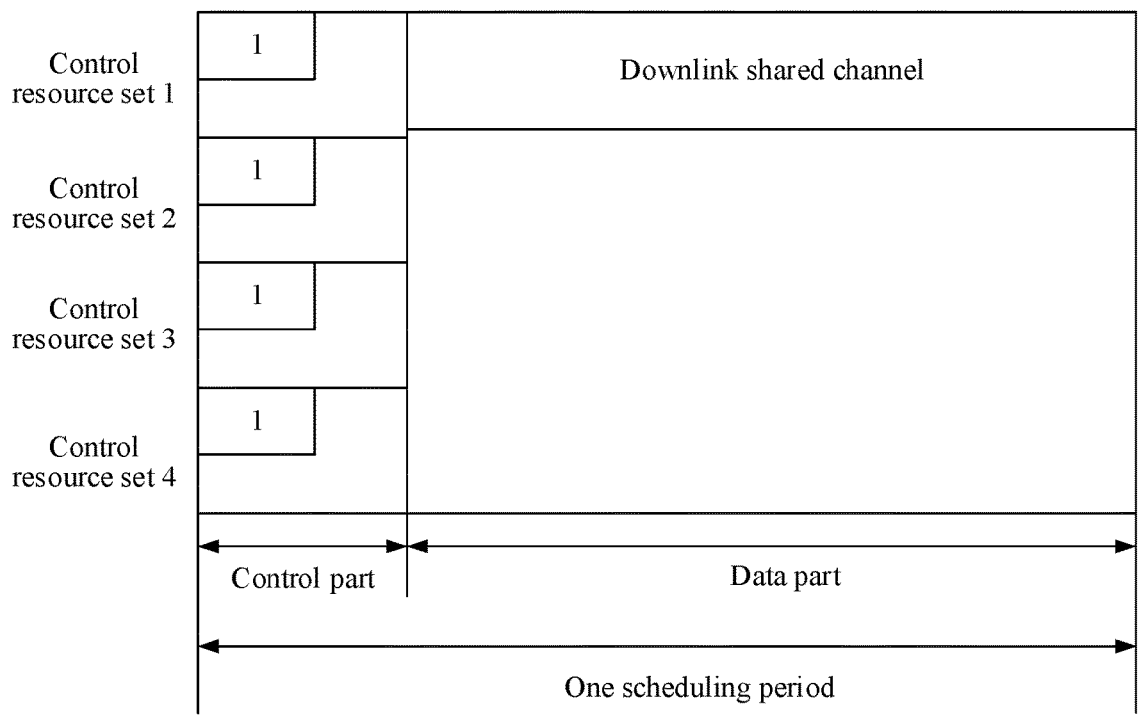
FIG. 8 is a schematic block diagram of a downlink control channel in one scheduling period according to this application.

For example, as shown in FIG. 8, for PDCCHs in one scheduling period, it is assumed that four control resource sets are configured for the terminal device in the scheduling period, where l represents a sequence number $l \in \{1, 2, 3, 4\}$ of a control resource set to which downlink control information is mapped. It is assumed that the downlink control information is mapped to a candidate downlink control channel whose aggregation level $AL_l$ is equal to 1 in different control resource sets, a quantity $N_{AL_l}$ of candidate downlink control channels whose $AL_l$ is equal to 1 is 4, and a corresponding candidate downlink control channel sequence number meets $X_{k,l,AL_l} \in \{1, 2, 3, 4\}$. For example, in a subframe 1, or a slot 1, or a mini-slot 1, downlink control information is mapped to a candidate downlink control channel whose aggregation level is 1 in a control resource set 1, a control resource set 2, a control resource set 3, and a control resource set 4. A correspondence between sequence numbers of to-be-combined candidate downlink control channels meets Formula (6).

$$X_{k,l+1,AL_l} = X_{k,l,AL_l} \quad (6)$$

In Formula, $X_{k,l,AL_l}$ represents the candidate downlink control channel sequence number at the aggregation level $AL_l$ in the first control resource set in the subframe k, the slot k, or the mini-slot k. If each subframe number, each slot number, or each mini-slot number, an aggregation level, a control resource set sequence number, and a candidate downlink control channel sequence number at the given aggregation level are substituted into Formula (6), the following is obtained in the subframe 1, the slot 1, or the mini-slot 1:

when the control resource set number is 1, $X_{k,l,AL_l} = X_{1,1,1} = 1, 2, 3, \text{ or } 4$;

when the control resource set number is 2, $X_{k,l,AL_l} = X_{1,2,1} = 1, 2, 3, \text{ or } 4$;

when the control resource set number is 3, $X_{k,l,AL_l} = X_{1,3,1} = 1, 2, 3, \text{ or } 4$; and when the control resource set number is 4, $X_{k,l,AL_l} = X_{1,4,1} = 1, 2, 3, \text{ or } 4$.

Sequence number combinations of candidate downlink control channels with $AL_l$ that may be combined in four scheduling periods are (1, 2, 3, 4), (1, 2, 3, 4), (1, 2, 3, 4), and (1, 2, 3, 4).

Table 12 shows a correspondence between a CORESET 1 and a first PDCCH candidate when an aggregation level of the PDCCH in each CORESET is 1.

User equipment combines and decodes a first PDCCH candidate whose aggregation level is 1 in the CORESET 1, a first PDCCH candidate whose aggregation level is 1 in a CORESET 2, a first PDCCH candidate whose aggregation level is 1 in a CORESET 3, and a first PDCCH candidate whose aggregation level is 1 in a CORESET 4.

TABLE 12

| Control resource set sequence number l | 1 | 2 | 3 | 4 |
|---|---|---|---|---|
| Aggregation level $AL_l$ | 1 | 1 | 1 | 1 |
| Candidate downlink control channel | 1 | 1 | 1 | 1 |
|  | 2 | 2 | 2 | 2 |
|  | 3 | 3 | 3 | 3 |
|  | 4 | 4 | 4 | 4 |

It should be understood that a correspondence between a CORESET and a PDCCH candidate is not limited to the case in Table 6. A quantity of combined PDCCH candidates is not specified, in other words, two PDCCH candidates may be combined and decoded, or three or four PDCCH candidates may be combined and decoded.

It should be further understood that the user equipment may perform blind detection for the PDCCH in one CORESET; or combine and decode corresponding PDCCH candidates in one CORESET; or attempt to perform blind detection for the PDCCH and combine and decode the corresponding PDCCH candidates in one CORESET, where an order of the attempt to perform blind detection and combining and decoding is not limited in this application.

Optionally, the first information is further used to indicate an aggregation level of a first candidate downlink control channel in each control resource set.

Specifically, the first information may further include the aggregation level of the first candidate downlink control channel in each control resource set.

It should be understood that aggregation levels of PDCCHs in each CORESET may be the same or may be different. Aggregation levels of the PDCCH candidates are not limited in this application, and may be same or may be different.

In the method 200, the method 300, the method 400, and the method 500, the first candidate downlink control channel and the second candidate downlink control channel in the claims indicate sequence numbers or identifiers of the candidate downlink control channels. For example, a quantity of first candidate downlink control channels corresponding to an aggregation level 1 in the first control resource set in the first scheduling period is 4. The first candidate downlink control channel in the claims indicates an identifier 1 of a candidate downlink control channel whose aggregation level is 1 in the first control resource set in the first scheduling period, or an identifier 2 of a candidate downlink control channel whose aggregation level is 1 in the first control resource set in the first scheduling period, or an identifier 3 of a candidate downlink control channel whose aggregation level is 1 in the first control resource set in the first scheduling period, or an identifier 4 of a candidate downlink control channel whose aggregation level is 1 in the first control resource set in the first scheduling period. A quantity of second candidate downlink control channels whose aggregation level is 1 in a second control resource set in the second scheduling period is 4. The second candidate downlink control channel in the claims indicates an identifier 1 of a candidate downlink control channel whose aggregation level is 1 in the second control resource set in the second scheduling period, or an identifier 2 of a candidate downlink control channel whose aggregation level is 1 in the second control resource set in the second scheduling period, or an identifier 3 of a candidate downlink control channel whose aggregation level is 1 in the second control resource set in the second scheduling period, or an identifier 4 of a candidate downlink control channel whose aggregation level is 1 in the second control resource set in the second scheduling period.

The downlink control information is carried on a candidate downlink control channel corresponding to a given aggregation level in a control resource set. For example, in the first control resource set, there are four candidate downlink control channels whose aggregation level is 1: a candidate downlink control channel 1, a candidate downlink control channel 2, a candidate downlink control channel 3, and a candidate downlink control channel 4. A network masks a cyclic redundancy check code of downlink control information of a terminal device 1 by using a radio network temporary identifier RNTI, and configures the masked downlink control information to be carried on the candidate downlink control channel 2. The radio network temporary identifier RNTI is a unique identifier configured by the network for the terminal device 1 in a serving cell. The terminal device 1 performs, by using the radio network temporary identifier RNTI, cyclic redundancy check code check on the downlink control information separately on the candidate downlink control channel 1, the candidate downlink control channel 2, the candidate downlink control channel 3, and the candidate downlink control channel 4. Because the cyclic redundancy check code used to carry data on the candidate downlink control channel 1, the candidate downlink control channel 3, and the candidate downlink control channel 4 is not masked by using the radio network temporary identifier RNTI, decoding cannot be successfully performed on the terminal device 1 to obtain the downlink control information. On the candidate downlink control channel 2, the terminal device 1 performs cyclic redundancy check code check on the downlink control information by using the radio network temporary identifier RNTI, and decoding can be successfully performed to obtain the downlink control information at a specific signal-to-noise ratio.

In all correspondences, a sequence number or an identifier of a candidate downlink control channel corresponding to a given aggregation level in a control resource set that is before the current scheduling period may be deduced based on the correspondence by using a sequence number or an identifier of a candidate downlink control channel corresponding to a given aggregation level in the control resource set in the current scheduling period. For example, the terminal device needs to combine and decode, in a third scheduling period, data or signals that are corresponding to the sequence number or the identifier of the downlink control channel obtained based on the correspondence and that are in data buffered in the current scheduling period and data buffered in two previous scheduling periods. Alternatively, a sequence number or an identifier of a candidate downlink control channel corresponding to a given aggregation level in a control resource set that is before a subsequent scheduling period may be deduced based on the correspondence by using a sequence number or an identifier of a candidate downlink control channel corresponding to a given aggregation level in the control resource set in the current scheduling period. For example, the current scheduling period is a first scheduling period, and the terminal device needs to buffer data in the current scheduling period and data in two subsequent scheduling periods, to perform combine and decode data or signals that are corresponding to the sequence number or the identifier of the candidate downlink control channel obtained based on the correspondence and that are in data buffered in the first, second, and third scheduling periods.

In the method 200, the method 300, the method 400, and the method 500, information transmitted through the PDCCH is the same. Same PDCCHs are corresponding to the same downlink control information DCI. Same PDCCH information attached by a cyclic redundancy check (CRC) code is mapped to the UE-specific search space in a CORESET after polar code channel coding is performed at a specific bit rate. There may be the following three implementations:

(1) Polar code channel coding at a code rate R1 and a code rate R2 is separately performed on the same PDCCH information attached by the CRC, to obtain control information after the channel coding, and the control information after the channel coding is processed (for example, is scrambled or modulated) and is mapped to the UE-specific search space at an aggregation level $AL_1$ and an aggregation level $AL_2$ in different CORESETs. When R1 is equal to R2, PDCCHs in different CORESETs are the same.

(2) Polar code channel coding at a code rate R is performed on the same PDCCH information attached by the CRC, to obtain control information after the channel coding. An information sequence of a length a and an information sequence of a length b are obtained through direct interception or in an interleaving mapping manner (not limited to the two manners). The information sequences are processed (for example, is scrambled or modulated) and are mapped to the UE-specific search space at an aggregation level $AL_1$ and an aggregation level $AL_2$ in different CORESETs. PDCCHs in different CORESETs are the same.

In the foregoing two manners, time-frequency resource positions of the scheduled PDSCH are the same. The DCI includes a domain used to indicate the time-frequency resource positions of the scheduled PDSCH. When the DCI is the same, information included in the DCI is the same.

(3) If the DCI does not include specific time-frequency resource positions of the scheduled PDSCH, but only transmits a parameter related to the scheduled PDSCH, for example, parameters such as duration of Y symbols occupied by the PDSCH in time domain and bandwidth of X PRBs occupied by the PDSCH in frequency domain. A time frequency resource mapping formula or a mapping pattern is known by the network device and the terminal device, and is specified or predefined by a protocol. The mapping relationship is related to the duration Y in time domain, the bandwidth X occupied in frequency domain, a current slot number (slot index), a terminal device ID, and the like of the scheduled PDSCH, to obtain different time-frequency positions of the scheduled PDSCH in different slots. This manner ensures that the DCI is the same, but positions of the scheduled PDSCH are different.

Figure 9:
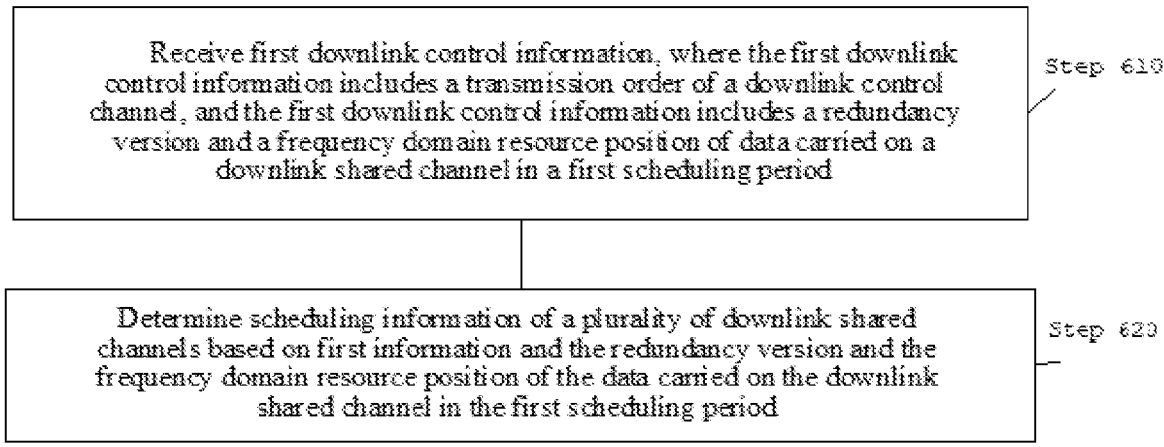
FIG. 9 is a schematic flowchart of a radio communication method 600 according to this application.

FIG. 9 is a schematic flowchart of a radio communication method 600 according to this application. As shown in FIG. 9, the method 600 includes the following content.

In step 610: Receive first downlink control information, where the first downlink control information includes a transmission order of a downlink control channel, and the first downlink control information includes a redundancy version and a frequency domain resource position of data carried on a downlink shared channel in a first scheduling period.

It should be understood that the transmission order is further used to indicate that the first downlink control information includes scheduling data for scheduling the downlink shared channel. A network device and a terminal device preset k scheduling periods to transmit a same PDSCH. The k scheduling periods may be consecutive or may be inconsecutive. A user determines, based on the transmission order n in the DCI, a specific PDCCH transmission order that is received for a first time, to know information, such as an RV version and a frequency domain resource position, that is for scheduling the first PDSCH in the PDCCH transmission and that is received for the first time. If domain information does not exist, the user knows only information about scheduling the PDSCH during each of the k times of scheduling, and cannot obtain, based on a subframe number, the scheduling information used for scheduling the first PDSCH. This is because the PDSCH is not necessarily transmitted continuously, and a specific PDSCH transmission order that is received for a first time is not known.

In step 620: Obtain scheduling information of a plurality of downlink shared channels based on first information and the redundancy version and the frequency domain resource position of the data carried on the downlink shared channel in the first scheduling period, where the first information is used to indicate a correspondence between a transmission order of a plurality of downlink control channels and the scheduling information of the data carried on the plurality of downlink shared channels.

Optionally, the first information includes a correspondence between a transmission order of the plurality of downlink control channels and a redundancy version and/or a frequency domain resource position of data carried on downlink shared channels corresponding to the plurality of downlink control channels.

Specifically, the first information includes the correspondence between the transmission order of the plurality of downlink control channels and the redundancy version and/or the frequency domain resource position of the data carried on the downlink shared channels corresponding to the plurality of downlink control channels.

When the frequency domain resource positions of the data carried on the plurality of downlink control channels are the same, the first information may include only the correspondence between the transmission order of the plurality of downlink control channels and the redundancy version of the data carried on the downlink shared channels corresponding to the plurality of downlink control channels.

When the redundancy versions of the data carried on the plurality of downlink control channels are the same, the first information may include only the correspondence between the transmission order of the plurality of downlink control channels and the frequency domain resource position of the data carried on the downlink shared channels corresponding to the plurality of downlink control channels.

For example, the first information may be shown as Table 13. Table 13 shows a correspondence among a transmission order of a plurality of downlink control channels and a redundancy version and an offset between frequency domain resource positions of data carried on downlink shared channels corresponding to the plurality of downlink control channels.

TABLE 13

| PDCCH transmission order | 1 | 2 | 3 | 4 |
| Offset between frequency domain resource positions for a PDSCH | — | $\Delta_1$ | $\Delta_2$ | $\Delta_3$ |
| RV version number of a PDSCH | 1 | 2 | 3 | 4 |

It should be understood that, when RV version numbers of the plurality of PDSCHs does not change, the first information may not include the RV version numbers of the PDSCHs.

It should be understood that the RV version numbers of the plurality of PDSCHs may be carried in scheduling information of the PDCCHs corresponding to the plurality of PDSCHs, and are not stored in the first information.

It should be further understood that, when offsets between frequency domain resource position of the plurality of PDSCHs are 0, the first information may not include the offsets between the frequency domain resource position of the plurality of PDSCHs.

Optionally, the obtaining, based on first information and the redundancy version and the frequency domain resource position of the data carried on the downlink shared channel in the first scheduling period, scheduling information of a plurality of downlink shared channels includes:

obtaining frequency domain resource positions of the plurality of downlink shared channels based on the frequency domain resource position of the data carried on the downlink shared channel in the first scheduling period and an offset, in the first information, between a downlink shared channel in each of a plurality of scheduling periods and a first downlink shared channel; and/or obtaining a redundancy version of the downlink shared channel in each of the plurality of scheduling periods from the first information.

Optionally, after the obtaining, based on first information and the redundancy version and the frequency domain resource position of the data carried on the downlink shared channel in the first scheduling period, scheduling information of data carried on a plurality of downlink shared channels, the method further includes:

decoding, based on the scheduling information of the data carried on the first downlink shared channel, the data carried on the first downlink shared channel; or combining and decoding, based on the scheduling information of the data carried on the first downlink shared channel and scheduling information of data carried on a downlink shared channel that is not decoded and that is before the first downlink shared channel, the first downlink shared channel and the downlink shared channel that is not decoded and that is before the first downlink shared channel.

It should be understood that, an order of directly decoding the PDSCH in the first scheduling period or combining and decoding on the PDSCH in the plurality of scheduling periods is not specified.

Figure 10:
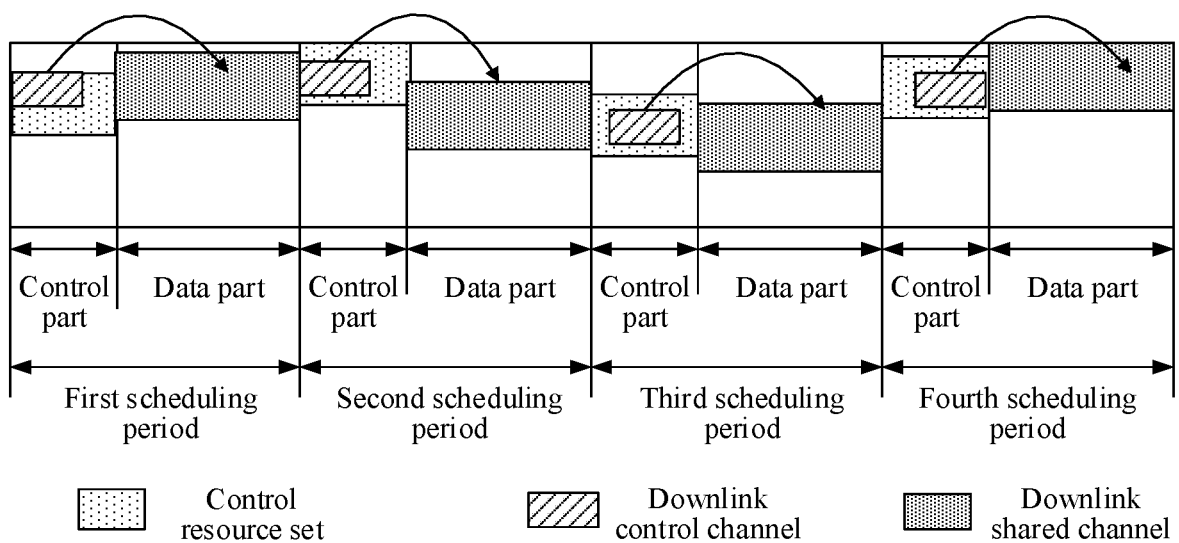
FIG. 10 is a schematic block diagram of downlink shared channels in different scheduling periods according to this application.

For example, as shown in FIG. 10, the network device and the terminal device predefine four PDSCH transmissions. When the terminal device listens to a first PDCCH transmission in the four PDCCH transmissions, but cannot successfully decode a corresponding scheduled PDSCH, the terminal device first obtains, based on the domain information in the DCI, a frequency domain resource position $f_1$ at which the scheduled PDSCH corresponding to the current PDCCH transmission is located is, and an RV version 1 of the scheduled PDSCH corresponding to the current PDCCH transmission, and then obtains, according to Table 11, offsets $\Delta 1$, $\Delta 2$, and $\Delta 3$ between frequency domain resource positions at which scheduled PDSCHs corresponding to the other three PDCCH transmissions are located, and RV versions 2, 3 and 4 of the scheduled PDSCH corresponding to the other three PDCCH transmissions (the four RV version numbers in Table 13 may be pre-defined or may be in a dynamic mapping relationship). The terminal device needs to continue to listen to the PDCCH, and determines, by correctly decoding indication information that is included in the PDCCH and that indicates a specific PDCCH transmission order, whether there is a scheduled PDSCH in a current subframe or a current mini-slot. If the terminal device listens to the PDCCH next time, the terminal device knows, based on the domain information, that the current PDCCH transmission is a fourth PDCCH transmission. The terminal device obtains, based on a mapping relationship in Table 4, an RV version 3 of the corresponding scheduled PDSCH, and decodes the scheduled PDSCH at a known frequency domain resource position $f_1+\Delta_3$ of the PDSCH in the current subframe or the current mini-slot. Alternatively, information about the PDSCH whose RV version is 3 and information about the PDSCH whose RV version is 1 are combined and decoded.

Figure 11:
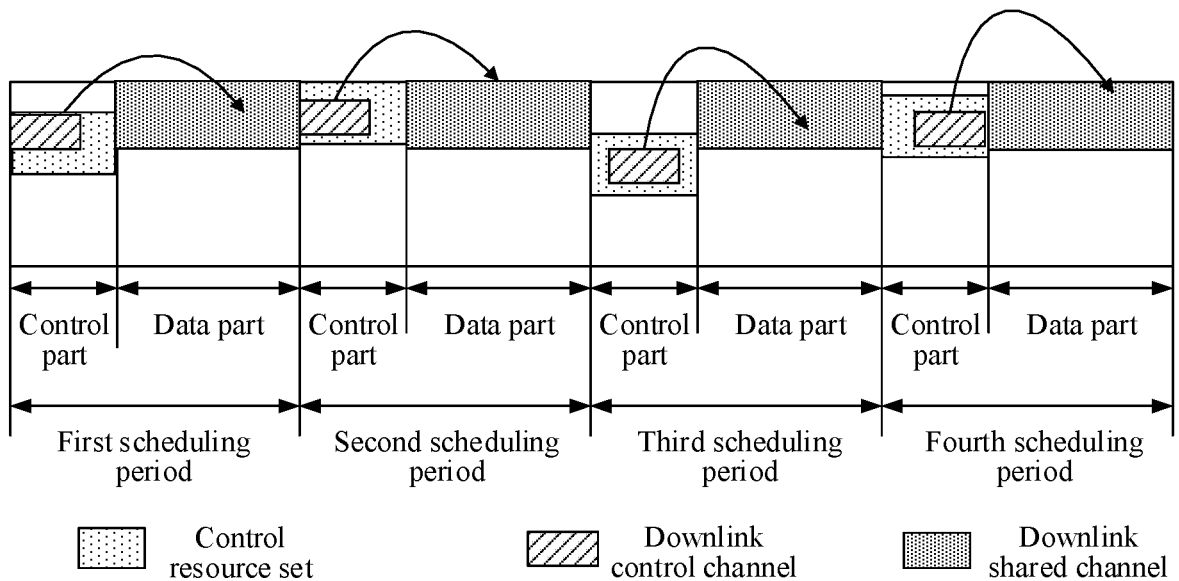
FIG. 11 is a schematic block diagram of downlink shared channels in different scheduling periods according to this application.

For another example, as shown in FIG. 11, the network device and the terminal device predefine four PDSCH transmissions, and a frequency domain resource position at which a PDSCH is transmitted in each scheduling period is fixed. When the terminal device listens to a second PDCCH transmission in the four PDCCH transmissions, but cannot successfully decode a corresponding scheduled PDSCH, the terminal device may obtain, based on domain information in the successfully decoded DCI, a frequency domain resource position at which the scheduled PDSCH is located, and then knows frequency domain resource positions of the other three scheduled PDSCHs. Then, an RV version 2 of the scheduled PDSCH corresponding to the current PDCCH transmission is obtained according to Table 13 (in this case, Table 13 does not need to include an offset between frequency domain resource positions of a PDSCH). The terminal device may continue to listen to the PDCCH until the terminal device knows, when the terminal device obtains a PDCCH that is listened to next time, that current PDCCH transmission is a fourth PDCCH transmission. According to a mapping relationship in Table 7, an RV version 3 corresponding to the scheduled PDSCH is obtained, and data is combined between the PDSCH with the RV version 3 and the PDSCH with the RV version 2, increasing a probability of successful decoding. Alternatively, the terminal device no longer listens to the PDCCH; and after obtaining that the RV version 2 of the PDSCH, the terminal device decodes data at a known frequency domain resource position of a PDSCH in a next scheduling period, or combines the data with the previously buffered PDSCH data before decoding.

Optionally, the first information is preconfigured, or received from a network device.

Specifically, the first information may be configured by the network device for the terminal device, and delivered to the terminal device by using higher layer signaling (for example, RRC signaling), or are sent by the network device to the terminal device by using physical layer signaling (for example, DCI signaling), or are stored in the terminal device as specified in a communications protocol. For example, the first information is stored in the terminal device as specified by the terminal device and the network device in the communications protocol.

In this way, the obtaining, based on the first information and the first downlink control information, the scheduling information of the data carried on the plurality of downlink shared channels and combining and decoding the data carried on the plurality of downlink shared channels avoids a phenomenon that when quality of the downlink control channel is comparatively poor, user equipment cannot decode the downlink shared channel in one scheduling period to obtain downlink scheduling data. This increases a probability of successfully decoding the PDSCH.

Figure 12:
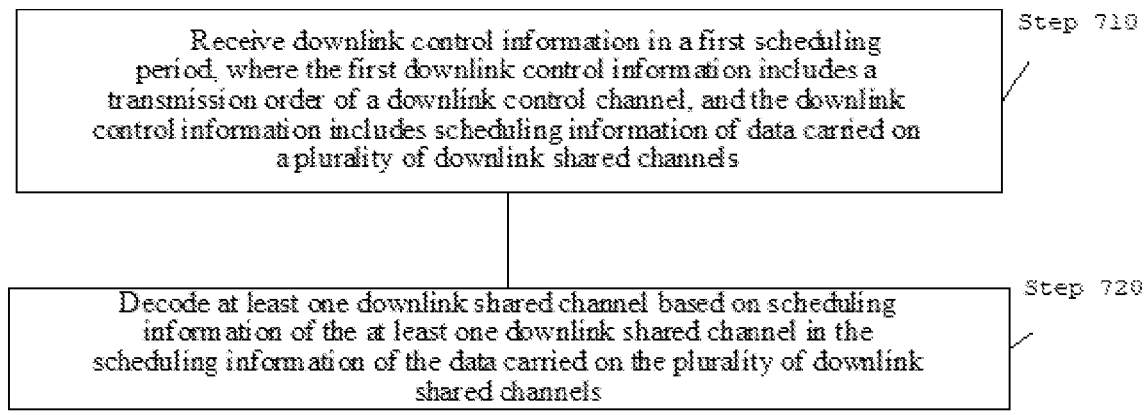
FIG. 12 is a schematic flowchart of a radio communication method 700 according to this application.

FIG. 12 is a schematic flowchart of a radio communication method 700 according to this application. As shown in FIG. 12, the method 700 includes the following content.

In step 710: Receive downlink control information that is in a first scheduling period, where the first downlink control information includes a transmission order of a downlink control channel, and the downlink control information includes scheduling information of data carried on a plurality of downlink shared channels.

It should be understood that the transmission order is further used to indicate that the first downlink control information includes scheduling data for scheduling the downlink shared channel. The network device and the terminal device preset k scheduling periods to transmit a same PDSCH. The k scheduling periods may be consecutive or may be inconsecutive. A user determines, based on the transmission order n in the DCI, a specific PDCCH transmission order that is received for a first time, to know information, such as an RV version and a frequency domain resource position, that is for scheduling the first PDSCH in the PDCCH transmission and that is received for a first time. If the domain information does not exist, the user knows only information about scheduling the PDSCH during each of the k times of scheduling, and cannot obtain, based on a subframe number, the scheduling information used for scheduling the first PDSCH. This is because the PDSCH is not necessarily transmitted continuously, and a specific PDSCH transmission order that is received for a first time is not known.

In step 720: Decode at least one downlink shared channel based on scheduling information of the at least one downlink shared channel in the scheduling information of the data carried on the plurality of downlink shared channels.

In this case, one piece of downlink control information DCI further includes scheduling information for k times PDSCH transmissions, for example, a redundancy version RV and a frequency domain resource position for scheduling the PDSCH. When user equipment blindly detects any one of the k PDCCH transmissions, it may be known that scheduling information for the k PDSCH transmissions may be decoded on a corresponding PDSCH or a plurality of downlink shared channels may be combined and decoded. This increases a probability of decoding the PDSCH.

It should be understood that the first scheduling period may be a current scheduling period.

Optionally, the decoding at least one downlink shared channel based on scheduling information that is of data carried on the at least one downlink shared channel and that is in the scheduling information of the data carried on the plurality of downlink shared channels includes:

decoding, based on the scheduling information of the data carried on the downlink shared channel in the current scheduling period, the data carried on a current shared downlink channel; or combining and decoding, based on the scheduling information of the data carried on the plurality of downlink shared channels and scheduling information of data carried on a downlink shared channel that is not decoded and that is before the current downlink shared channel, the current downlink shared channel and the downlink shared channel that is not decoded and that is before the current downlink shared channel.

Optionally, the first information is preconfigured, or received from a network device.

Specifically, the first information may be configured by the network device for the terminal device, and delivered to the terminal device by using higher layer signaling (for example, RRC signaling), or are sent by the network device to the terminal device by using physical layer signaling (for example, DCI signaling), or are stored in the terminal device as specified in a communications protocol. For example, the first information is stored in the terminal device as specified by the terminal device and the network device in the communications protocol.

Specifically, the one piece of downlink control information DCI further includes scheduling information for scheduling the PDSCH for k times, for example, a redundancy version RV and a frequency domain resource position for scheduling the PDSCH. When user equipment blindly detects any one of the k PDCCH transmissions, it may be known that scheduling information for the k PDCCH transmissions may be decoded on a corresponding PDSCH. The user equipment knows, based on the indication information in the DCI, a specific PDCCH transmission order that is received currently, to know information, such as an RV version and a frequency domain resource position, that is for scheduling the current PDSCH in the PDCCH transmission and that is received currently. If the user equipment does not listen to the PDCCH in the current scheduling period, the user equipment may continue to listen to a PDCCH in the next scheduling period. Once the PDCCH is listened to, all information about scheduling the PDSCH for k times is known, and receiving of the PDSCH is not affected.

If the user equipment can correctly decode the currently scheduled PDSCH, the user equipment stops listening to the PDCCH and stops decoding the PDSCH scheduled by the PDCCH, and feeds back a HARQ-ACK. If the user equipment cannot correctly decode the PDSCH currently, the user equipment needs to continue to listen to the PDCCH, information about a specific transmission order of the current PDCCH transmission is indicated in the DCI, to obtain whether the scheduled PDSCH is in the current scheduling period or the mini-slot. If the scheduled PDSCH is in the current scheduling period or the mini-slot, PDSCH information is decoded at a frequency domain resource position of the scheduled PDSCH corresponding to the information about the transmission order of the current PDCCH transmission, or is decoded after combining with previously buffered PDSCH information of a different RV version. An order of directly decoding the PDSCH and combining and decoding PDSCHs is not specified.

Figure 13:
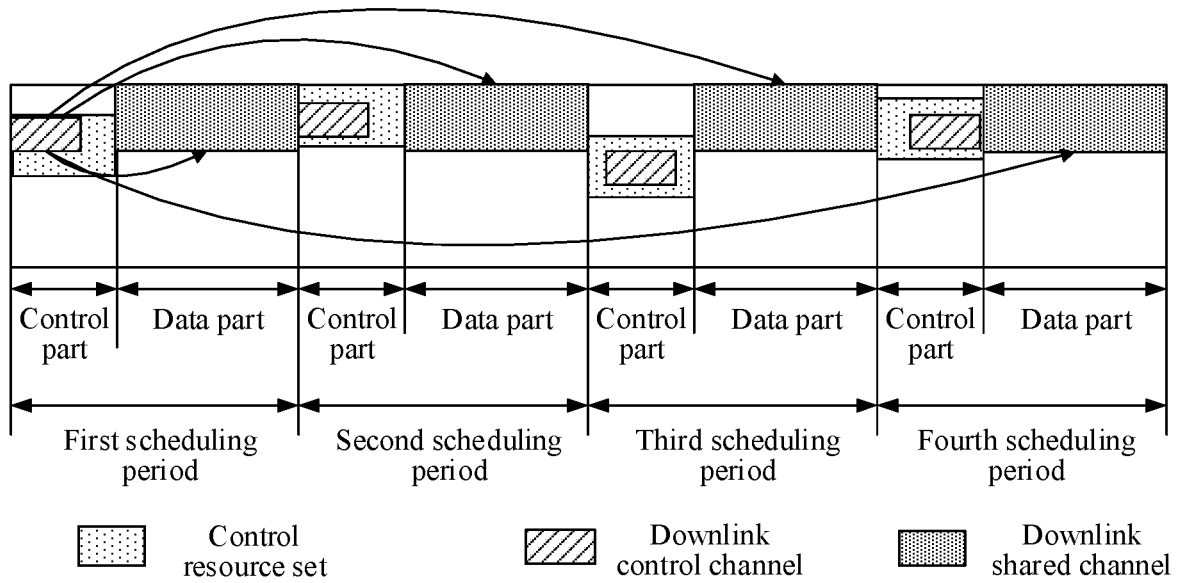
FIG. 13 is a schematic block diagram of downlink shared channels in different scheduling periods according to this application.

For example, as shown in FIG. 13, the network device and the terminal device predefine four PDSCH transmissions, in other words, four different PDCCHs are transmitted in four scheduling periods. A PDCCH 1 is transmitted in a first scheduling period, a PDCCH 2 is transmitted in a second scheduling period, a PDCCH 3 is transmitted in a third scheduling period, and a PDCCH 4 is transmitted in a fourth scheduling period. The PDCCH 1, the PDCCH 2, the PDCCH 3, and the PDCCH 4 include scheduling information of four PDSCHs. It is assumed that user equipment does not blindly detect the PDCCH 1 in a control resource set in the first scheduling period, but blindly detects the PDCCH 2 in a control resource set in the second scheduling period, obtains information for scheduling all PDSCHs in the four scheduling periods, and knows, based on indication information in DCI, that a specific order of current PDSCH scheduling in the four times of scheduling, so that information such as an RV version and a time-frequency resource position of the currently scheduled PDSCH can be obtained. If the user equipment fails to blindly detect the PDCCH 2, the user equipment may continue to listen to the PDCCH in a next scheduling period.

Figure 14:
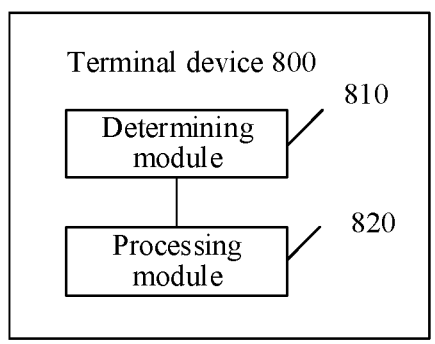
FIG. 14 is a schematic block diagram of a terminal device 800 according to this application.

FIG. 14 is a schematic block diagram of a terminal device 800 according to this application. As shown in FIG. 14, the terminal device includes:

a determining module 810, configured to obtain, in a second scheduling period based on a first candidate downlink control channel and first information, a second candidate downlink control channel, where the first information is used to indicate a correspondence between the first candidate downlink control channel and the second candidate downlink control channel, where the first candidate downlink control channel is any candidate downlink control channel in a first control resource set corresponding to a first scheduling period, the second candidate downlink control channel is any candidate downlink control channel in a first control resource set in the second scheduling period, and downlink control information carried in the first candidate downlink control channel and downlink control information carried in the second candidate downlink control channel are the same; and a processing module 820, configured to combine and decode the first candidate downlink control channel and the second candidate downlink control channel.

Optionally, the determining module 810 and the processing module 820 are configured to perform operations of the radio communication method 200 in the embodiments of this application. For brevity, details are not described herein again.

The determining module 810 of the terminal device 800 in this application is further configured to select a first candidate downlink control channel and a corresponding second candidate downlink control channel in a second scheduling period based on first information. The downlink control information carried in the first candidate downlink control channel and the downlink control information carried in the second candidate downlink control channel are the same.

The first candidate downlink control channel is any candidate downlink control channel in a first control resource set in a first scheduling period.

The second candidate downlink control channel is any candidate downlink control channel in a first control resource set in the second scheduling period.

The first information is used to indicate a correspondence between a candidate downlink control channel in the first scheduling period and a candidate downlink control channel in the second scheduling period.

The processing module 820 is further configured to combine and decode the first candidate downlink control channel and the second candidate downlink control channel.

Optionally, the determining module 810 and the processing module 820 are configured to perform operations of the radio communication method 300 in the embodiments of this application. For brevity, details are not described herein again.

The determining module 810 of the terminal device 800 in this application is further configured to select a first candidate downlink control channel and a corresponding second candidate downlink control channel in a second scheduling period based on first information. The downlink control information carried in the first candidate downlink control channel and the downlink control information carried in the second candidate downlink control channel are the same.

The first candidate downlink control channel is any candidate downlink control channel in a first control resource set in a first scheduling period.

The second candidate downlink control channel is any candidate downlink control channel in a first control resource set in the second scheduling period, and the first information indicates that positions and sizes of frequency domain resources on downlink control channels in the plurality of scheduling periods are the same.

The processing module 820 is further configured to combine and decode the first candidate downlink control channel and the second candidate downlink control channel.

Optionally, the determining module 810 and the processing module 820 are configured to perform operations of the radio communication method 400 in the embodiments of this application. For brevity, details are not described herein again.

The determining module 810 of the terminal device 800 in this application is further configured to obtain a first candidate downlink control channel from each of a plurality of control resource sets based on first information, where the first information indicates a correspondence between first candidate downlink control channels in the plurality of control resource sets in the first scheduling period; and the first candidate downlink control channels in the plurality of control resource sets in the first scheduling period carry same downlink control information.

The processing module 820 is further configured to decode the downlink control information on the first candidate downlink control channel in the control resource set.

Optionally, the determining module 810 and the processing module 820 are configured to perform operations of the radio communication method 500 in the embodiments of this application. For brevity, details are not described herein again.

The determining module 810 of the terminal device 800 in this application is further configured to receive first downlink control information. The first downlink control information includes a transmission order of a downlink control channel, and the first downlink control information includes a redundancy version and a frequency domain resource position of data carried on a downlink shared channel in a first scheduling period.

The processing module 820 is further configured to obtain, based on first information and the redundancy version and the frequency domain resource position of the data carried on the downlink shared channel in the first scheduling period, scheduling information of a plurality of downlink shared channels. The first information is used to indicate a correspondence between a transmission order of a plurality of downlink control channels and the scheduling information of the data carried on the plurality of downlink shared channels.

Optionally, the determining module 810 and the processing module 820 are configured to perform operations of the radio communication method 600 in the embodiments of this application. For brevity, details are not described herein again.

The determining module 810 of the terminal device 800 in this application is further configured to receive downlink control information in a first scheduling period. The first downlink control information includes a transmission order of the downlink control channels, and the downlink control information includes scheduling information of data carried on a plurality of downlink shared channels.

The processing module 820 is further configured to decode at least one downlink shared channel based on scheduling information of the at least one downlink shared channel in the scheduling information of the data carried on the plurality of downlink shared channels.

Optionally, the determining module 810 and the processing module 820 are configured to perform operations of the radio communication method 700 in the embodiments of this application. For brevity, details are not described herein again.

The terminal device corresponds to the terminal device in the method embodiments, and corresponding steps are performed by corresponding modules. For details, refer to the corresponding method embodiments.

Figure 15:
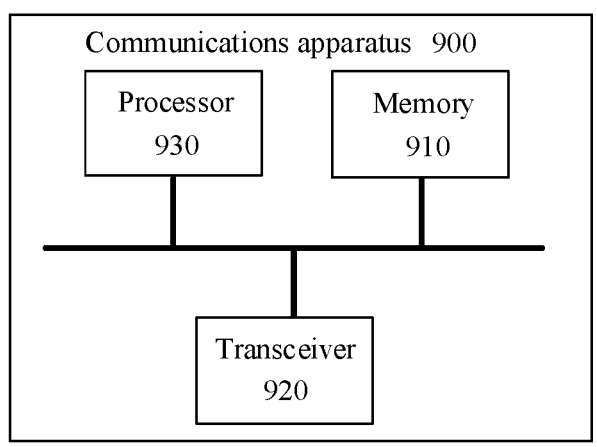
FIG. 15 is a schematic block diagram of a communications apparatus 900 according to this application.

FIG. 15 is a schematic block diagram of a communications apparatus 900 according to this application. The communications apparatus 900 includes:

a memory 910, configured to store a program, where the program includes code;

a transceiver 920, configured to communicate with another device; and a processor 930, configured to execute the program code in the memory 910.

Optionally, when the code is executed, the processor 930 may implement operations of the method 200, the method 300, the method 400, the method 500, the method 600, or the method 700. For brevity, details are not described herein again. In this case, the communications apparatus 600 is a terminal device. The transceiver 920 is configured to transmit and receive a specific signal after being driven by the processor 930.

The communications apparatus 900 may be the foregoing terminal device, to perform an operation of an obtaining module. The transceiver may include a transmitter and/or a receiver, to perform corresponding steps of the obtaining module and the processing module respectively.

The embodiments of the present invention further provide a system chip. The system chip includes an input/output interface, at least one processor, at least one memory, and a bus. The at least one memory is configured to store an instruction, and the at least one processor is configured to invoke the instruction in the at least one memory, to perform the operations of the method in each of the foregoing aspects.

A person of ordinary skill in the art may be aware that, units and algorithm steps of the examples described with reference to the embodiments disclosed in this specification may be implemented by electronic hardware or a combination of computer software and electronic hardware. Whether the functions are performed by hardware or software depends on a particular application and a design constraint of a technical solution. A person skilled in the art may use different methods to implement the described functions for each particular application, but it should not be considered that the implementation goes beyond the scope of this application.

It may be clearly understood by the person skilled in the art that, for convenience and brevity of description, for specific working processes of the foregoing system, apparatus, and unit, reference may be made to corresponding processes in the foregoing method embodiments. Details are not described herein again.

In the several embodiments provided in this application, it should be understood that, the disclosed system, apparatus, and method may be implemented in other manners. For example, the unit division is merely logical function division, and may be other division in actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and components displayed as units may or may not be physical units. To be specific, the components may be located in one position, or may be distributed onto a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product.

The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, for example, a USB flash drive, a removable hard disk, a read-only memory (ROM), a random access memory (RAM), a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A radio communication method, comprising:
obtaining, in a second scheduling period, based on a first candidate downlink control channel and first information, a second candidate downlink control channel from a first control resource set corresponding to the second scheduling period, wherein the first information is used to indicate a correspondence between the first candidate downlink control channel and the second candidate downlink control channel, wherein
the first candidate downlink control channel is any candidate downlink control channel in a first control resource set corresponding to a first scheduling period;
combining and decoding the first candidate downlink control channel and the second candidate downlink control channel, comprising:
obtaining a first aggregation level of the first candidate downlink control channel and a second aggregation level of the second candidate downlink control channel based on second information, wherein
decoding manners of candidate downlink control channels at different aggregation levels are different; and
combining and decoding the first candidate downlink control channel at the first aggregation level and the second candidate downlink control channel at the second aggregation level.

2. The method according to claim 1, wherein before the obtaining a second candidate downlink control channel based on a first candidate downlink control channel and first information, the method further comprises:
obtaining an offset between a sequence number of the second candidate downlink control channel and a sequence number of the first candidate downlink control channel, a first aggregation level of the first candidate downlink control channel, and a second aggregation level of the second candidate downlink control channel based on second information; and
the obtaining a second candidate downlink control channel based on a first candidate downlink control channel and first information comprises:
obtaining the second candidate downlink control channel based on the first information, the first candidate downlink control channel, the offset, the first aggregation level, and the second aggregation level.

3. The method according to claim 1, wherein when the first scheduling period is corresponding to a plurality of control resource sets, or the second scheduling period is corresponding to a plurality of control resource sets, the method further comprises:
obtaining the first control resource set in the first scheduling period and the first control resource set in the second scheduling period based on third information.

4. The method according to claim 3, wherein the first information, the second information, and the third information are preconfigured, or received from a network device, or stored locally.

5. The method according to claim 1, wherein the first scheduling period is adjacent to or not adjacent to the second scheduling period.

6. An apparatus, comprising a memory and a processor, wherein the memory is configured to store a program, where the program includes codes;

the processor is configured to execute the codes in the memory, to enable the apparatus to implement the following steps:

obtaining, in a second scheduling period, based on a first candidate downlink control channel and first information, a second candidate downlink control channel from a first control resource set corresponding to the second scheduling period, wherein the first information is used to indicate a correspondence between the first candidate downlink control channel and the second candidate downlink control channel, wherein the first candidate downlink control channel is any candidate downlink control channel in a first control resource set corresponding to a first scheduling period;

combining and decoding the first candidate downlink control channel and the second candidate downlink control channel, comprising:

obtaining a first aggregation level of the first candidate downlink control channel and a second aggregation level of the second candidate downlink control channel based on second information, wherein decoding manners of candidate downlink control channels at different aggregation levels are different; and combining and decoding the first candidate downlink control channel at the first aggregation level and the second candidate downlink control channel at the second aggregation level.

7. The apparatus according to claim 6, wherein the processor is further configured to execute codes in the memory, to enable the apparatus to obtain an offset between a sequence number of the second candidate downlink control channel and a sequence number of the first candidate downlink control channel, a first aggregation level of the first candidate downlink control channel, and a second aggregation level of the second candidate downlink control channel based on second information; and the obtaining a second candidate downlink control channel based on a first candidate downlink control channel and first information comprises:

obtaining the second candidate downlink control channel based on the first information, the first candidate downlink control channel, the offset, the first aggregation level, and the second aggregation level.

8. The apparatus according to claim 6, wherein when the first scheduling period is corresponding to a plurality of control resource sets, or the second scheduling period is corresponding to a plurality of control resource sets, the processor is further configured to execute codes in the memory, to enable the apparatus to obtain the first control resource set in the first scheduling period and the first control resource set in the second scheduling period based on third information.

9. The apparatus according to claim 8, wherein any one of the first information, the second information, and the third information is preconfigured, or received from a network device, or stored locally.

10. The apparatus according to claim 6, wherein the first scheduling period is adjacent to or not adjacent to the second scheduling period.

11. An apparatus, comprising a memory and a processor, wherein the memory is configured to store a program, where the program includes codes;

the processor is configured to execute the codes in the memory, to enable the apparatus to implement the following steps:

selecting a first candidate downlink control channel and a corresponding second candidate downlink control channel in a second scheduling period based on first information, wherein the first candidate downlink control channel is any candidate downlink control channel in a first control resource set corresponding to a first scheduling period, and the second candidate downlink control channel is any candidate downlink control channel in a first control resource set in the second scheduling period;

the first information is used to indicate a correspondence between a candidate downlink control channel in the first scheduling period and a candidate downlink control channel in the second scheduling period;

combining and decoding the first candidate downlink control channel and the second candidate downlink control channel, comprising:

obtaining a first aggregation level of the first candidate downlink control channel and a second aggregation level of the second candidate downlink control channel based on second information, wherein decoding manners of candidate downlink control channels at different aggregation levels are different; and combining and decoding the first candidate downlink control channel at the first aggregation level and the second candidate downlink control channel at the second aggregation level.

12. The apparatus according to claim 11, wherein the selecting a first candidate downlink control channel and a corresponding second candidate downlink control channel based on first information comprises:

obtaining the first candidate downlink control channel and the second candidate downlink control channel based on the correspondence between a candidate downlink control channel in the first scheduling period and a candidate downlink control channel in the second scheduling period.

13. The apparatus according to claim 11, wherein
when the first scheduling period is corresponding to a plurality of control resource sets, or the second scheduling period is corresponding to a plurality of control resource sets, the processor is further configured to execute codes in the memory, to enable the apparatus to obtain the first control resource set in the first scheduling period and the first control resource set in the second scheduling period based on third information.

14. The apparatus according to claim 13, wherein the first information, the second information, and the third information are preconfigured, or received from a network device, or stored locally.

15. The apparatus according to claim 11, wherein the first scheduling period is adjacent to or not adjacent to the second scheduling period.

* * * * *